United States Patent
Hattori et al.

(12)

(10) Patent No.: US 6,206,535 B1
(45) Date of Patent: Mar. 27, 2001

(54) PLANAR LIGHTING DEVICE AND METHOD OF MAKING LIGHT GUIDES USED THEREIN

(75) Inventors: Yukitoshi Hattori; Takeya Sakai; Masaya Morino; Hiroshi Nakayama, all of Nagoya (JP)

(73) Assignee: Hayashi Telempu Co., Ltd., Aichi (JP)

( * ) Notice: Subject to any disclaimer, the term of this patent is extended or adjusted under 35 U.S.C. 154(b) by 0 days.

(21) Appl. No.: 09/450,734

(22) Filed: Nov. 30, 1999

(51) Int. Cl.[7] ........................................................ F21V 7/04
(52) U.S. Cl. ................ 362/31; 362/27; 362/331
(58) Field of Search ............... 362/31, 330, 331, 362/326; 385/146, 901

(56) References Cited

U.S. PATENT DOCUMENTS

| | | | |
|---|---|---|---|
| 5,548,670 | 8/1996 | Koike | 385/27 |
| 5,899,552 | 5/1999 | Yokoyama et al. | 362/31 |

FOREIGN PATENT DOCUMENTS

| | | |
|---|---|---|
| 6-324330 | 11/1994 | (JP) . |
| 7-134298 | 5/1995 | (JP) . |
| 7-270708 | 10/1995 | (JP) . |
| 9-258030 | 10/1997 | (JP) . |
| 10-308113 | 11/1998 | (JP) . |

*Primary Examiner*—Sandra O'Shea
*Assistant Examiner*—Hargobind S. Sawhney
(74) *Attorney, Agent, or Firm*—Sughrue, Mion, Zinn, Macpeak & Seas, PLLC

(57) ABSTRACT

A light guide member (2) includes a first light guide section (2A), which is a non-scattering light guide region, and a second light guide section (2B) which is a scattering light guide section and is made of material of the same composition as that of the first light guide section (2A), but mixed with scattering particles. Therefore, while the concentration of the scattering particles in the second light guide section (2A) is retained as high as possible, the gradient of the light scattering power can be increased to thereby allow a light exit surface to exhibit a high brightness and uniformity in luminance over the entire surface thereof. Also, the first light guide section (2A) and the second light guide section (2B) are formed by bonding them in the thicknesswise direction by the effect of a cohesive strength exhibited by material themselves therefore. Accordingly, there is no need to separately mold and then bond the first and second light guide sections (2A, 2B), the light guide member (2) can be molded at a time, accompanied by increase in productivity. In addition, since no bonding agent is used at the interface, the flatness can be secured with high precision.

14 Claims, 15 Drawing Sheets

Fig. 8
A
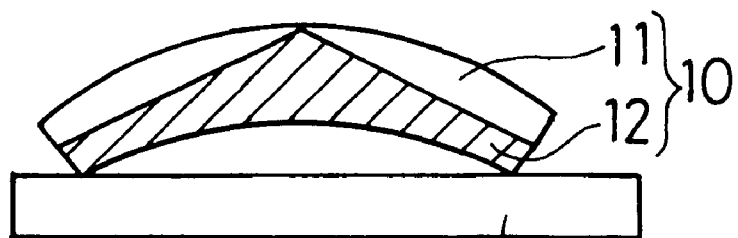
B
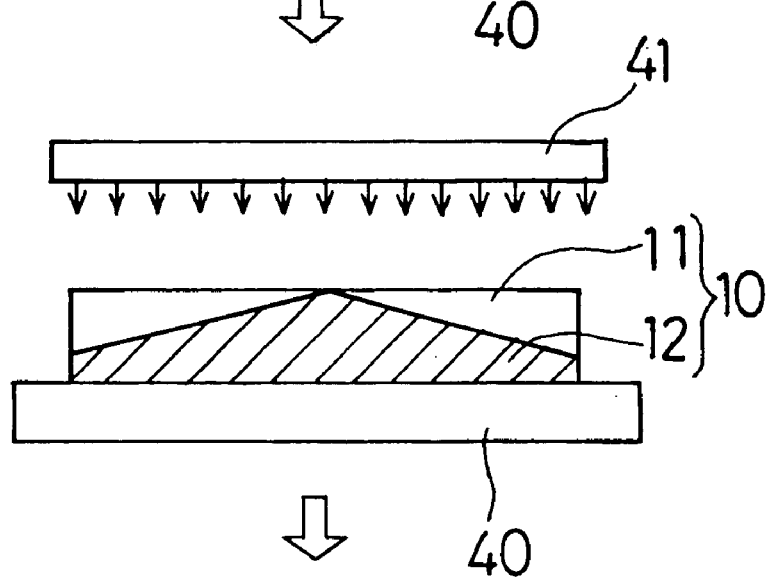
C
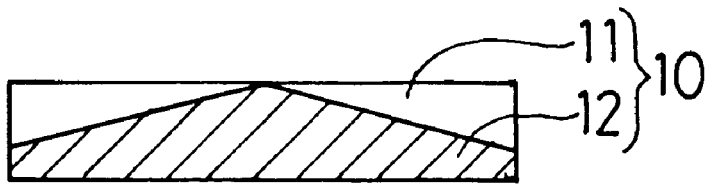

PLANAR LIGHTING DEVICE AND METHOD OF MAKING LIGHT GUIDES USED THEREIN

BACKGROUND OF THE INVENTION

1. Field of the Invention

The present invention relates to a planar lighting device such as a back-lighting device in a liquid crystal display, for exiting illuminating light from a light exit surface of a light guide member by scattering rays of light incident on the light guide member from a light source.

2. Description of the Prior Art

As a planar lighting device such as a back-lighting device in a liquid crystal display, the planar lighting device has hitherto been well known which comprises a flat plate-like light guide member and a tubular light source disposed adjacent and in face-to-face relation with an end face of the light guide member, wherein rays of light from the light source are, after having entered the light guide member, scattered to allow illuminating light to emerge outwardly from the light exit surface of the light guide member to thereby uniformly illuminate the liquid crystal display from behind. In recent years, demand for increase of the size of the planar lighting device with an increased surface area of the light exiting surface of the light guide member has arisen intensively along with demand for reduction in thickness thereof and, therefore, the uniformity of brightness compatible with increase in size and reduction in thickness is required.

FIG. 13 illustrates the first planar lighting device according to the prior art, which comprises a light guide member 42 in the form of a transparent resin plate such as an acrylic resin plate having a high light transmissivity and two light sources 4 such as cold-cathode tubes each positioned adjacent a corresponding end face 46 of the light guide member 42 and covered by a reflective plate 27. This first prior art flat lighting device is such that while a reflecting surface 44 of the light guide member 42 is provided with a finely dotted irregular reflecting layer 29 formed by the use of a screen printing technique or a shot-blasting technique so that rays of light incident upon and propagating in the transparent resin plate 42 from the light sources 4 can be reflected to emerge outwardly from the light exit surface 45. The planar lighting device in which the irregular reflecting layer is formed on one surface of the transparent resin plate has an advantage in that it can be manufactured having a reduced thickness.

There is also known the second prior art planar lighting device which comprises, as shown in FIG. 14, a wedge-shaped light guide member 70 prepared from a transparent resin mixed with scattering particles having an index of refraction different from that of the transparent resin, and a tubular light source such as a cold-cathode tube disposed adjacent and in face-to-face relation with one end face 70a of the light guide member 70. The flat plate-like light guide member in which in place of the light guide member in the second-mentioned prior art planar lighting device wedge-shaped light guide sections are overlapped one above the other in the direction of thickness thereof as shown in FIG. 15. This third-mentioned prior art planar lighting device shown in FIG. 15 comprises a light guide plate 80 including a first light guide section 80A made of a transparent resin (a non-scattering light guide region) and a second light guide section 80B made of a transparent resin mixed with scattering particles having an index of refraction different therefrom (a scattering light guide region), and is disclosed in, for example, the U.S. Pat. No. 5,899,552.

Yet, the Japanese Laid-open Patent Publication No. 6-324330 discloses a fourth prior art planar lighting device comprising a light guide plate 90 including two wedge-shaped light guide sections 90A and 90B made of respective transparent resins containing a different concentration of scattering particles and, hence, having a different light scattering power, which wedge-shaped light guide sections 90A and 90B are overlapped one above the other in the thicknesswise direction thereof. In the third- and fourth-mentioned prior art planar lighting devices wherein the plural light guide plates having a different light scattering power are employed, as compared with the second-mentioned prior art planar lighting device, the light scattering power can be adjusted over the entire area of the light exit surface of the light guide plate and, therefore, the uniformity of brightness can easily be secured where the surface area of the light exit surface is relatively small.

The fifth prior art planar lighting device that satisfies the requirement of increase in size and reduction in thickness is illustrated in FIG. 17. This fifth prior art planar lighting device shown in FIG. 17 comprises a light guide member 50 formed to a shape similar to the prism-like hill corresponding to two light guide members 51 combined together, which light guide members 51 are similar to the wedge-shaped light guide sections 51A and 51B employed in the fourth prior art planar lighting device shown in FIG. 16, and two light sources 4 and 4 disposed adjacent and in face-to-face relation to opposite end faces 50a of the light guide member 50.

The planar lighting device formed in a hill-like shape with a polygonal pyramid and having a light source disposed adjacent and in face-to-face relation with each end face thereof is effective to provide a high luminance when rays of light are incident thereupon through the end faces. The hill-like shape may be a shape of, for example, a triangular pyramid and a square pyramid, and an extremely flattened hill-like shape can be obtained with respect to the requirement of the thickness being reduced. As a sixth prior art flat lighting device, a light guide member formed into, for example, a hill-like shape similar to the shape of a square pyramid is shown in FIG. 18A in a perspective representation. FIG. 18B is a cross-sectional representation of the light guide member 10 taken along the line IV—IV in FIG. 18A. This light guide member 10 includes a first light guide section (a non-scattering region) 11 having a recess of a shape similar to the inverted shape of a square pyramid and a second light guide section (a scattering region) 12 having a protrusion of a shape similar to the shape of a square pyramid.

As a method of making the light guide member used in the third to sixth prior art flat lighting devices, a method is known wherein, for example, two light guide sections are separately molded and are subsequently bonded together by the use of a bonding agent or the like.

Any of the first and second prior art planar lighting devices discussed above is suited where the light exit surface area is relatively small and, if the light exit surface is increased to increase the size of the planar lighting device, difficulty will arise in that a high brightness and a uniformity in luminance can no longer be secured. In other words, with the first prior art planar lighting device, in order to compensate for a phenomenon in which the brightness decreases with increase of the distance from the light source, the irregular reflectance is varied in unison with the light guiding distance (the distance from the end face of the light guide member), that is, the number of irregular reflecting layers is necessarily increased with increase of the distance away from the light source, and therefore, it is not easy to secure the uniformity in luminance. With the second prior art planar lighting device, since the single light source is employed, no high brightness can be obtained.

As regards the third prior art planar lighting device, as will be discussed in detail later, the first light guide section (a non-scattering light guide region) 80A and the second light guide section (a scattering light guide region) 80B are separately molded and are then bonded together by the use of a bonding agent or the like and, therefore, the workability is low since the both are bonded together after the molding, accompanied by increase in manufacturing cost. Also, since the bonding agent or the like is under at the interface, there is another problem in that it is difficult to secure flatness with high precision.

As regards the fourth prior art planar lighting device, since the light scattering power is varied by employing different concentrations of the scattering particles in the two light guide sections, the difference between those concentrations of the scattering particles in those light guide sections, that is, the gradient of the light scattering power, is limited to a small value. Where the planar lighting device is made large in size, it is necessary to increase the amount of light exiting therefrom as the distance increases away from the light source, but if the gradient of the light scattering power is small, the required amount of the light exiting therefrom can not be secured at a position distant from the light source, resulting in a problem associated with difficulty in securement of the uniformity of luminance. Also, where the concentration of the scattering particles in one of the light guide sections is reduced considerably, for example, down to 0.01 wt %, a problem will arise that such one of the light guide sections is difficult to manufacture.

Any one of the second to sixth prior art flat lighting devices involves such a problem that since due to the difference in angle between each of the reflecting surface and the light exit surface and the end face of the wedge-shaped light guide section, the rays of light from the light source incident upon the wedge-shaped light guide member repeatedly exit and reflect within the wedge shape and, hence, interfere with each other, resulting in occurrence of line-shaped bright spots at a portion of the light exit surface adjacent the light source. To eliminate the occurrence of the bright spot, it has hitherto been required to separately dispose a light reflecting member or a light absorbing member at a location adjacent the light source.

In addition, the second to sixth prior art flat lighting devices has an additional problem in that bright spots different from those discussed above tend to occur on a portion of the light exit surface adjacent the light source. By way of example, in the second prior art flat lighting device shown in FIG. 14, since the electrode portions 4a at the opposite ends of the light source (a cold cathode tube) 4 barely emit light, a sufficient amount of light will not enter the opposite side portions of the light guide member 70 facing the corresponding electrode portions 4a and, accordingly, the brightness of light emerging from respective portions of the light exit surface adjacent such side portions of the light guide member 70 tends to become insufficient, resulting in bright spots of the light emerging therefrom. Therefore, in order to avoid the occurrence of the bright spots, it is necessary for the light source 4 to be extended beyond the side surface 70b of the light guide member 70. Since extra portions of the light source so extended will occupy respective portions of the liquid crystal display where the display frame ought to have been and, therefore, the display frame cannot be narrowed.

On the other hand, as discussed hereinbefore, it has been known that the light guide member employed in any one of the third to sixth prior art flat lighting device is manufactured by, for example, molding the first and second light guide sections separately, followed by bonding of those light guide sections together by the use of a bonding agent. Since this method requires the bonding after the molding, the workability is not sufficient and the manufacturing cost is high. A further problem is involved in that since the bonding agent or the like is used at the interface, it is difficult to secure flatness with high precision. In particular, those problems are paramount when the light guide member is to be manufactured in a large size and a reduced thickness. In such case, in terms of productivity, the injection molding technique appears to be feasible rather than the conventional bonding technique. However, where the above described light guide member has a shape similar to the shape of a flattened hill so that it can be manufactured in a large size and a reduced thickness, formation of the light guide member by means of the conventional injection molding technique will bring about the following problems.

When it comes to the injection molding of the light guide member, it is a general practice to provide an inlet port 13 of a mold assembly at a location corresponding to an outer periphery of a display surface as shown in FIG. 18A. This is because if an inlet port 14 of a mold assembly is disposed at a location confronting the display surface, fine burrs (a trace of the inlet port) will be formed on the molded display surface, which burrs will form flaws that eventually adversely affects the display. For this reason, the necessity will occur to inject a resin from the outer periphery, but if a portion of the first light guide section 11 adjacent the bottom apex 11a of the recess in the first light guide section 11 is reduced in thickness in order for the light guide member to be eventually molded having a reduced thickness (which connotes reduction of the size of a gap in the mold assembly), the resin will hardly flow at that portion. Because of this, it is necessary for that portion of the bottom apex 11a to have a sufficient thickness to a certain extent, making it difficult to manufacture the light guide member having a reduced thickness.

Also, injecting the resin from the outer periphery requires increase of the distance over which the resin flows from one point of the outer periphery to the opposite point thereof. Therefore, the pressure and the load required to inject the resin are required to be high, resulting in a considerable increase of the strain in the resin which would in turn bring about unevenness in the resin. This in turn results in a problem associated with non-uniformity of the brightness.

Furthermore, when the second light guide section 12 is molded after the first light guide section 11 has been molded by the use of the injection molding technique, since the bottom apex 11a of the recess in the first light guide section 11 has a small thickness, heat will be evolved at a portion adjacent the bottom apex 11a by the effect of the injection molding pressure and, therefore, as the resin for the second light guide section 12 flows, the resin tends to become irregular at that portion adjacent the bottom apex 11a, resulting in a problem associated with non-uniformity of the brightness.

SUMMARY OF THE INVENTION

Accordingly, the present invention has been devised to eliminate the above discussed problems and is intended to provide an improved planar lighting device capable of securing uniformity in brightness even though it is made large in size and small in thickness and also to provide an improved method of molding a high-quality light guide member and having a high productivity.

In order to accomplish the above described object of the present invention, the planar lighting device according to one aspect of the present invention comprises a substantially flat plate-like light guide member having end faces opposite to each other and also having a light exit surface, and at least one tubular light source disposed adjacent the end face of the light guide member in face-to-face relation thereto, rays of light incident upon the light guide member from the light source being scattered and subsequently emerging outwardly from the light exit surface of the light guide member. The light guide member includes first and second light guide sections made of a material of the same composition. The first light guide section is a non-scattering light guide region whereas the second light guide section is made of the material mixed with scattering particles having a different index of refraction. The first and second light guide sections are overlapped one above the other in a thicknesswise direction thereof by the effect of cohesive strength that is exhibited by the material for both of the first and second light guide sections.

In this light guide member, by partially varying the degree of occupancy of each of the first and second light guide sections in the direction across the thickness of the light guide member according to the position from the end faces, the brightness of light emerging from the light exit surface of the light guide member can be controlled.

In the planar lighting device of the structure described above, since the index of refraction of the light guide member is greater than that of air, rays of light entering the light guide member through the end face thereof ultimately travel within the light guide member while undergoing a total reflection according to the Snell's Law, but only light incident upon the scattering particles is scattered to allow the light, emerging outwardly from the light guide member, to spread outwardly. This scattering phenomenon is repeated and only the guided light, whose angle relative to the interface of the air is smaller than the critical angle emerge outwardly from the light guide member. The amount of the scattering particle and the particle size thereof govern the intensity of and the pattern of distribution of the light emerging from the light guide member. Accordingly, these design parameters considerably affects the quality of illumination.

In general, the planar lighting device is required to emit light at a high luminance uniformly. Where the planar lighting device is so designed as to allow light incident upon the end face of the light guide member to be guided therethrough such as in the present invention, that is, in a so-called edge-light type lighting device, the amount of the emitted light can be increased by increasing the concentration of the scattering particles in the light guide plate. However, an excessive increase of the concentration of the scattering particles will promote exit of light adjacent the light source, but will result in abrupt reduction in brightness as the distance from the light source increases, accompanied by increase of the size of the bright spot at the light exit surface. in other words, the concentration of the scattering particles is limited to a value equal to or lower than a predetermined level.

On the other hand, where the light guide member is made up of the two light guide sections, where the lighting device is made large in size by increasing the area of the light exit surface, the difference between the respective concentrations of the scattering particles in those light guide sections, that is, the gradient of the light scattering power is preferably large. If the lighting device is made large in size, it is necessary to increase the amount of the emitted light as the distance from the light source increases, but if the gradient of the light scattering power is small, the sufficient amount of the emitted light cannot be secured at a position distant from the light source. For this reason, as is the case with, for example, the fourth prior art lighting device, the light guide member comprising the two light guide sections containing the different concentrations of the scattering particles mixed in the transparent resins to thereby differentiate the light scattering power is problematic in that no uniformity in luminance can be obtained or, even though uniformity in luminance can be obtained, the total brightness will decrease.

Since the light guide member according to the present invention comprises the first light guide section, which is the non-scattering light guide region, and the second light guide section which is the scattering light guide region, and since as compared with the fourth prior art lighting device, the gradient of the light scattering power can be increased while the concentration of the scattering particles in the second light guide section is retained as high as possible, a high brightness and uniformity in luminance can be obtained over the entire light exit surface. Also, since the light scattering power can be increased, occurrence of the line-shaped bright spots tending to appear at a portion of the light exit surface adjacent the light source can be avoided by avoiding interference between the emitted rays of light resulting from the difference between any of the reflecting and light exit surfaces and the end face of the wedge-shaped light guide member. Accordingly, there is no need to dispose the light reflecting member or the light absorbing member at the location adjacent the light source such as required in the prior art.

Moreover, the first and second light guide sections are formed by bonding them together by the effect of the cohesive force exhibited by the material for each of the first and second light guide sections, that is, by being successively injected and fusion-bonded together to as to be overlapped one above the other in the thicknesswise direction by means of, for example, the injection molding method. Accordingly, there is no need to bond the first and second light guide sections after they have been separately molded. Therefore, the light guide member can be molded at a time, accompanied by increase in productivity and, also, since no bonding agent is used at the interface, the flatness can be secured with high precision.

Furthermore, since the first and second resins which are material for the first and second light guide sections referred to above, respectively, contain a different mixing ratio of the light scattering particles so that they can have a different light scattering power, the respective materials for the first and second resins employed in the practice of the present invention are of the same composition. The use of the material of the same composition for each of the first and second resins facilitates bonding at the interface during lamination. Also, since the use of the same material results in the same index of refraction and it is equivalent to the absence of the interface, no reflection occur at the interface and, therefore, no non-uniformity in luminance which would be brought about by reflection at the interface will occur.

It is, however, to be noted that even though the first and second resins are materials different from each other, similar materials effective to bring about the difference between the respective indexes of refraction of the first and second resins which is equal to or smaller than 0.1 are preferred. Similarly, no reflection at the interface occur substantially and, therefore, no non-uniformity in luminance resulting therefrom will occur.

In a preferred embodiment, the planar lighting device includes a third light guide section made of a material of the same composition as that of the material for any of the first and second light guide sections and having a higher concentration of scattering particles than that in the second light guide section. In this case, the first, second and third light guide sections are overlapped one above the other in the thicknesswise direction by the effect of cohesive strength that is exhibited by the material for any of the first, second and third light guide sections.

Accodingly, since the use of the third light guide section having a high concentration of the scattering particles results in increase of the gradient of the light scattering power, the minimum plate thickness can be increased even when the light guide device is made large in size and small in thickness, accompanied by increase in moldability.

In another aspect of the present invention, the planar lighting device comprises a substantially flat plate-like light guide member having end faces opposite to each other and also having a light exit surface, and at least one tubular light source disposed adjacent the end face of the light guide member in face-to-face relation thereto. Rays of light incident upon the light guide member from the light source are scattered and subsequently emerging outwardly from the light exit surface of the light guide member. The light guide member in this planar lighting device includes first and second light guide sections made of a material of the same composition having a different concentration of scattering particles mixed therein. The second light guide section has a higher light scattering power than that of the first light guide section. The first and second light guide sections are overlapped one above the other in a thicknesswise direction thereof by the effect of cohesive strength that is exhibited by the material for both of the first and second light guide sections. The first light guide section has a plate thickness decreasing as the distance increases away from the end face of the light guide member. The second light guide section includes a main body having a plate thickness increasing as the distance increases away from the end face of the light guide member. This light guide member further includes at least one brightness adjusting portion having a plate thickness increasing towards the end faces of the light guide member and side faces of the light guide member. This brightness adjusting portion is disposed at a location adjacent the side face of the light guide member and in face-to-face relation with an electrode portion at one end of the light source.

According to this aspect of the present invention, the light guide member includes the second light guide section of a high light scattering power which is provided with the brightness adjusting portion disposed at one side thereof confronting the electrode portion at one end of the light source and having a plate thickness increasing towards the end face and the side face of the light guide member. Accordingly, since the plate thickness of a portion of the second light guide section adjacent the side of the light guide member is increased so as to compensate for the amount of shortage of light at the electrode portion of the light source and the number of repetition of scattering within the second light guide section is increased to thereby increase the amount of light, the brightness can be increased with no need to change the angle of emergence of light at the side of the light guide member. In this way, since the angle of emergence of light is not changed at the side of the light guide member, no displacement occur in the direction of emergence of light and, therefore, the uniformity in luminance is high and a high brightness can be obtained.

In a preferred embodiment of the present invention, the planar lighting device is such that the brightness adjusting portion is formed in continuation with the main body and positioned between the first light guide section and the main body of the second light guide section, said brightness adjusting portion being of a triangular pyramid shape having a triangular side face defined on each of the end and side faces of the light guide member, said triangular faces having a common side on the line of intersection of the end and side faces of the light guide member and a bottom face defined on the main body.

A method of molding the flat light guide member adapted to be used in a planar lighting device, as defined in the present invention, which is carried out by successively injecting and laminating a first resin to form the first light guide section and a second resin to form the second light guide section, includes the steps of injecting the first resin into a primary shaping mold assembly including first and second molds to form a first light guide section, opening the primary shaping mold assembly with the second mold separated relatively from the first mold with the first light guide section retained by the first mold, coupling a secondary shaping mold assembly to the first mold while the first light guide section is retained by the first mold, and injecting the second resin into the secondary shaping mold assembly to form a second light guide section that is then laminated with the first light guide section.

In the method discussed above, the second mold is opened after the first light guide section has been molded and, while the first light guide section is retained within the first mold, the first mold is coupled to the second light guide section to mold the latter. Accordingly, mere replacement of the second mold with the secondary shaping mold assembly relative to the first mold is effective to laminate the second light guide section on the first light guide section. Accordingly, there is no need to separately mold and subsequently bond the first and second light guide sections such as required in the prior art, the light guide member can be molded at a time accompanied by increase in productivity and, also, since no bonding agent is used at the interface, the flatness can be secured with high precision. Moreover, since the first and second light guide sections are successively molded, the plate thickness for each of the first and second light guide section will not increase and, since the length of time required to cool the resin can be shortened, the production cycle time can be reduced.

In addition, since the first and second resins have a different light scattering power by differentiating the degree of mixing of the finely divided particles, and respective materials themselves for the first and second resins are of the same composition. The use of the material of the same composition for each of the first and second resins facilitates bonding at the interface during lamination. Also, since the use of the same material results in the same index of refraction and it is equivalent to the absence of the interface, no reflection occur at the interface and, therefore, no non-uniformity in luminance which would be brought about by reflection at the interface will occur.

IN a preferred embodiment of the present invention, the method of making the light guide member for use in the planar lighting device is such that the light guide member comprises the first light guide section having a recess of a shape similar to the inverted shape of a hill and the second light guide section having a protrusion of a shape similar to the shape of a hill, and wherein the first light guide section is molded by the first resin which is injected through an inlet port of the primary shaping mold assembly which is defined at a location corresponding to a portion where a bottom apex of the recess is formed in the first light guide section.

According to the above described embodiment, the inlet port of the primary shaping mold assembly is provided in correspondence with the portion where the bottom apex of the recess in the first light guide section and its neighborhood are formed. Accordingly, (1) since the first resin flows from a narrow portion towards a large portion when the first resin is injected directly from the narrow portion of the gap, injection can easily be accomplished even with the narrow gap as compared with the case in which while the inlet port is provided at the outer peripheral portion the resin is injected so as to flow from a large portion towards a narrow portion. (2) The distance over which the resin flows to each outer side portion can be shortened. Accordingly, since in view of the feature (1) discussed above the injection is possible even with the narrow gap, the bottom apex can have a reduced thickness and, as a result thereof, the plate thickness of the light guide member can be reduced. Also, it can cope with the requirement to increase the size. Since in view of the feature (2) discussed above, the pressure and the load acting on the injection can be reduced, accompanied by reduction of the strain developed in the resin, no irregularity will occur, allowing the brightness to become uniform. Also, even though a resin having a low fluidity, that is, a high viscosity (a high molecular weight, a high melting point, a high heat-resistance) is used for the first resin, the distance of flow of the resin is so small that the resin can be fed to the outer side with a minimized injection pressure, making it possible to reduce the plate thickness and, hence, to reduce the thickness of the light guide member.

Moreover, even though fine burrs (a trace of the inlet port) may be formed as flaws on the surface of the bottom apex of the first light guide section, since the secondary molded article is formed after the molding of the first light guide section, that is, two-stage molding is performed, the burrs left in the first light guide section can be melted and diminished as the second resin for the second light guide section flows along the primary molded article.

In another preferred embodiment of the present invention the method of making the light guide member adapted to be used in the planar lighting device is such that the second light guide section is molded by the second resin which is injected through an inlet port of the secondary shaping mold assembly which is defined at a location corresponding to a portion where an outer peripheral portion of the second light guide section is formed. Since the inlet port is provided at the location corresponding to that portion where the outer peripheral portion of the second light guide section is formed, there is no possibility that flaws may be left on the display surface and therefore the display will not be adversely affected.

Preferably the method of making the light guide member adapted to be used in the planar lighting device is such that the second resin for the second light guide section has a melt index which is greater than that of the first resin for the first light guide section by 10 g/10 min or more.

The term "melt index" (hereinafter referred to as MI) is intended to means the velocity of flow of a thermoplastic resin extruded at a predetermined temperature under a predetermined pressure through an orifice having a predetermined length and a predetermined diameter, that is, a fluidity of the resin.

If the melt index (MI) of the second resin is greater than that of the first resin by 10 g/10 min or less, irregularity will occur in the light guide member. However, if it is greater by 10 g/10 min or more, the resin for the second light guide section is easy to flow and the injection pressure can therefore be reduced and, since no irregularity occurs, the brightness can be made uniform. Also, since the respective melt indexes of the first and second resins can be determined by differentiating the mixing ratio of finely divided particles, and since the first and second resins are prepared from the materials of the same composition, mere change of the degree of polymerization of each of those resins is effective to control the MI and, hence, the light guide member having the above described characteristics can easily be manufactured at a high yield.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 8 is a schematic side sectional view showing a method of eliminating a warp occurring in the light guide member during the two-color injection molding;

DETAILED DESCRIPTION OF THE EMBODIMENTS

Hereinafter, the present invention will be described in connection with preferred embodiments thereof taken only for illustrative purpose.

Figure 1:
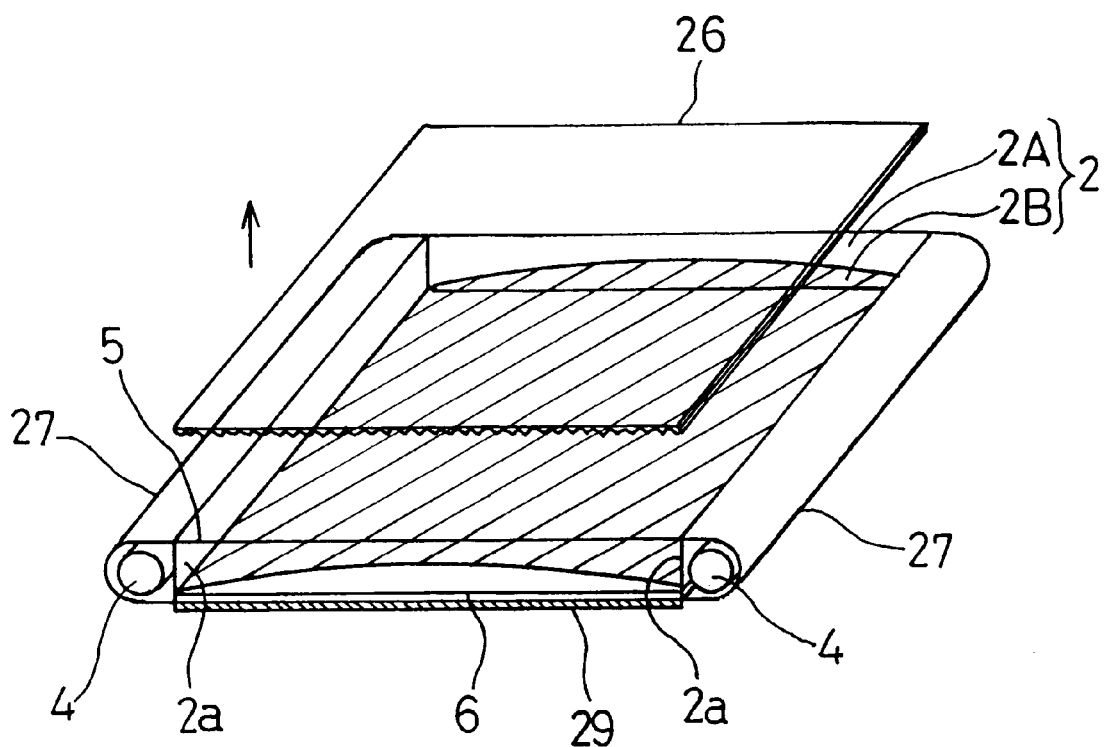
FIG. 1 is a schematic perspective view of a planar lighting device according to a first preferred embodiment of the present invention.

Referring to FIG. 1, a planar lighting device according to the first preferred embodiment of the present invention comprises a substantially flat light guide member 2 of a generally rectangular plate-like configuration having end faces 2a opposite to each other and also having a light exit surface 5 and a light reflecting surface 6 opposite to the light exit surface 5, and a tubular light source 4 disposed adjacent and in face-to-face relation to each end face 2a of the flat light guide member 2. This planar lighting device is so configured and so designed that rays of light emitted from the tubular light sources 4 and subsequently entering the light guide member 2 through the opposite end faces 2a thereof can emerge outwardly from the light exit surface 5 after having been scattered within the light guide member 2. To maximize the efficiency of utilization of light, an axial portion of each of the tubular light sources 4 which does not face towards the adjacent end face 2a of the flat light guide member 2 is covered by a corresponding reflector plate 27. The light reflecting surface 6 has a light reflecting layer 29 fitted thereto with an air layer intervening between the light reflecting surface 6 and the light reflecting layer 29, whereas the light exit surface 5 has a light polarizing layer 26 fitted thereto with an air layer intervening between the light exit surface 5 and the light polarizing layer 26. The light-polarizing layer 26 is of a prism-like configuration and is used to enhance the light collecting capability.

The light guide member 2 includes a first light guide section 2A, which serves as a non-scattering light guide region, and a second light guide section 2B which serves as a scattering light guide region, both of the first and second guide sections 2A and 2B being made of a material of the same composition. The first and second light guide sections 2A and 2B are overlapped one above the other in a thicknesswise direction thereof by the effect of the cohesive strength that is exhibited by the material for both of the first and second light guide sections 2A and 2B. In other words, the first and second light guide sections 2A and 2B are sequentially injected and fusion-bonded together by the use of an injection molding method as will be described later, so that the both can be bonded thicknesswise to each other.

By partially varying the degree of occupancy of the first and second light guide sections 2A and 2B in the direction across the thickness of the light guide member 2 according to the position from the end faces 2a, the brightness of light emerging from the light exit surface 5 of the light guide member 2 is controlled. As shown in FIG. 1, the second light guide section 12, for example, represents an upwardly curved shape similar to the shape of a hill when viewed from a side face 2b of the light guide member 2.

Figure 2A:
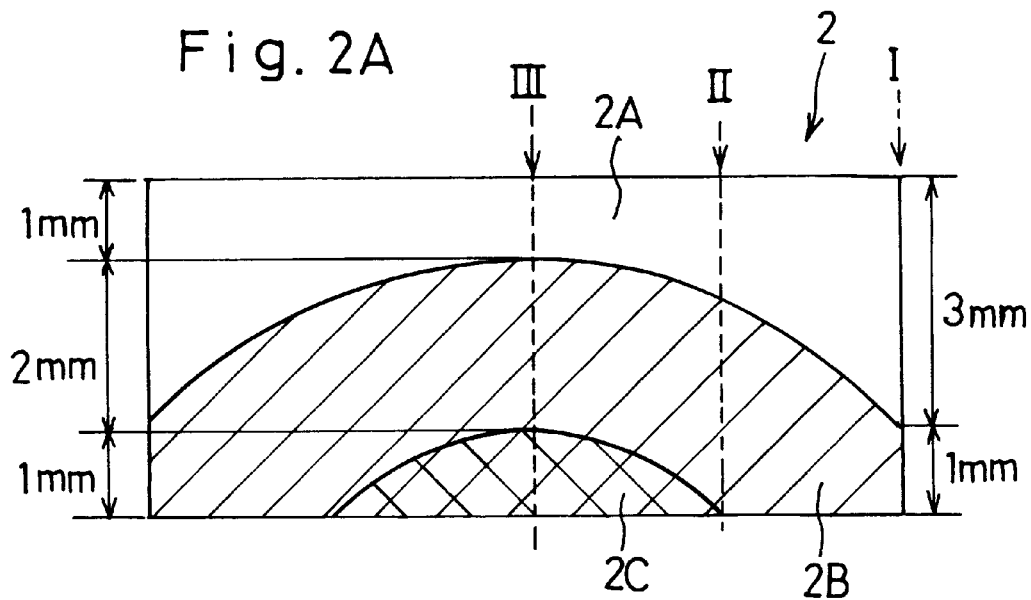
FIG. 2A is a schematic perspective view of the planar lighting device according to a second preferred embodiment of the present invention.
Figure 2B:
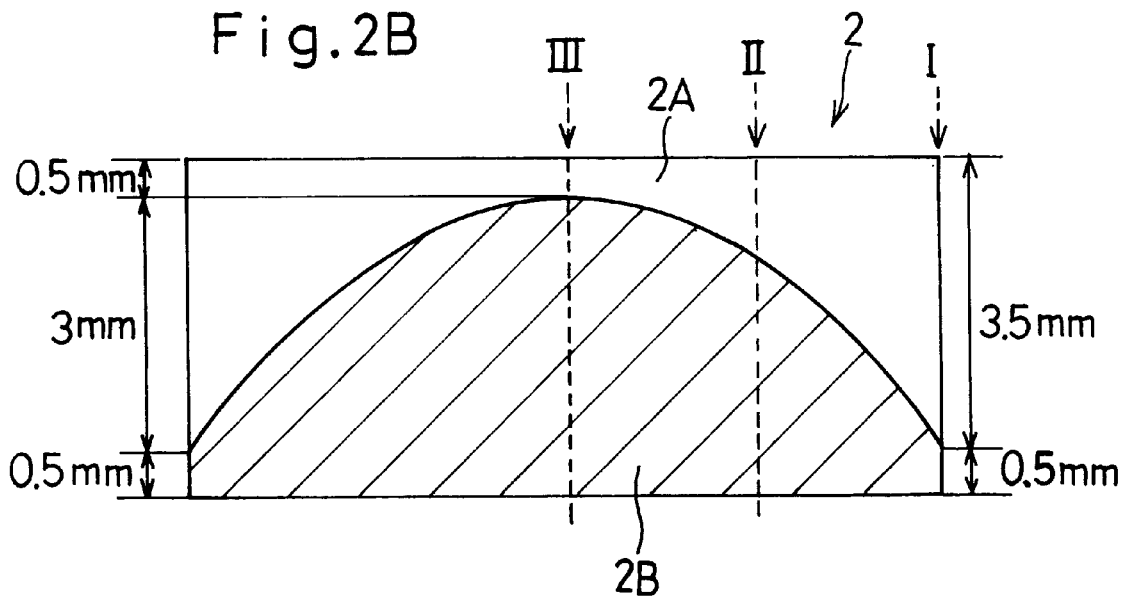
FIG. 2B is a schematic side view showing a comparative planar lighting device taken only for comparison purpose.

As shown in FIG. 2A in connection with a second preferred embodiment of the present invention, the light guide member 2 may further comprises a third light guide section 2C made of a material of the same composition as that of the material for each of the first and second light guide sections 2A and 2B, but containing a higher concentration of the scattering particles than that in the second light guide section 2B, in which case the first to third light guide sections 2A, 2B and 2B are overlapped one above the other by the effect of the cohesive strength exhibited by the material for each of the first to third light guide sections 2A to 2C in the thicknesswise direction. FIG. 2B illustrates the light guide member 2 comprising only the first and second light guide sections 2A and 2B according to the first preferred embodiment of the present invention, which is shown as a comparative example for the purpose of comparison with the light guide member 2 of FIG. 2A.

In this case, let it be assumed that the respective concentrations of the scattering particles contained in the first, second and third light guide sections 2A, 2B and 2C of the light guide member shown in FIG. 2A are 0 wt % (transparent), 0.2 wt % and 1 wt % while the respective concentrations of the scattering particles contained in the first and second light guide sections 2A and 2B of the light guide member shown in FIG. 2B are 0 wt % and 0.4 wt %. It is also assumed that the respective plate thicknesses of those light guide sections of each of the light guide members shown are such as shown in FIGS. 2A and 2B.

The respective average concentrations at Section I are:
(3×0+1×0.2)/4=0.05(wt %) in the case of FIG. 2A, and
(3.5×0+0.5×0.4)/4=0.05(wt %) in the case of FIG. 2B,
and, therefore, equal in those cases.

The respective average concentrations at Section III are:
(1×0+2×0.2+1×1)/4=0.35(wt %) in the case of FIG. 2A, and
(0.5×0+3.5×0.4)/4=0.35(wt %) in the case of FIG. 2B,
and, therefore, equal in those cases.

Similarly, the respective average concentrations at Section II are equal in the cases of FIGS. 2A and 2B.

Accordingly, the light guide members shown in FIGS. 2A and 2B can exhibit an equal light scattering power since the respective average concentrations at any of the sections remain equal, but the light guide member shown in FIG. 2A requires a minimum plate thickness of 1 mm whereas that of the light guide member shown in FIG. 2B is 0.5 mm. Thus, the light guide member 2 shown in FIG. 2A and according to the second embodiment of the present invention can, if provided with the third light guide section 3C having a high concentration of the scattering particles as shown in FIG. 2B, exhibit an increased gradient of the light scattering power and can have a minimum plate thickness that can be increased even if the size thereof is increased or the thickness is decreased, thereby making it possible to be easily molded accompanied by increase in moldability.

Although in this embodiment the light guide member 2 has the third light guide section 2C having a higher concentration of the scattering particles than that in the second light guide section 2B, which is formed on one of opposite surfaces of the second light guide section 2B remote from the first light guide section 2A, the third light guide section 3C may be provided on the other of the opposite surfaces of the second light guide section 2B adjacent the first light guide section 2A.

Figure 3:
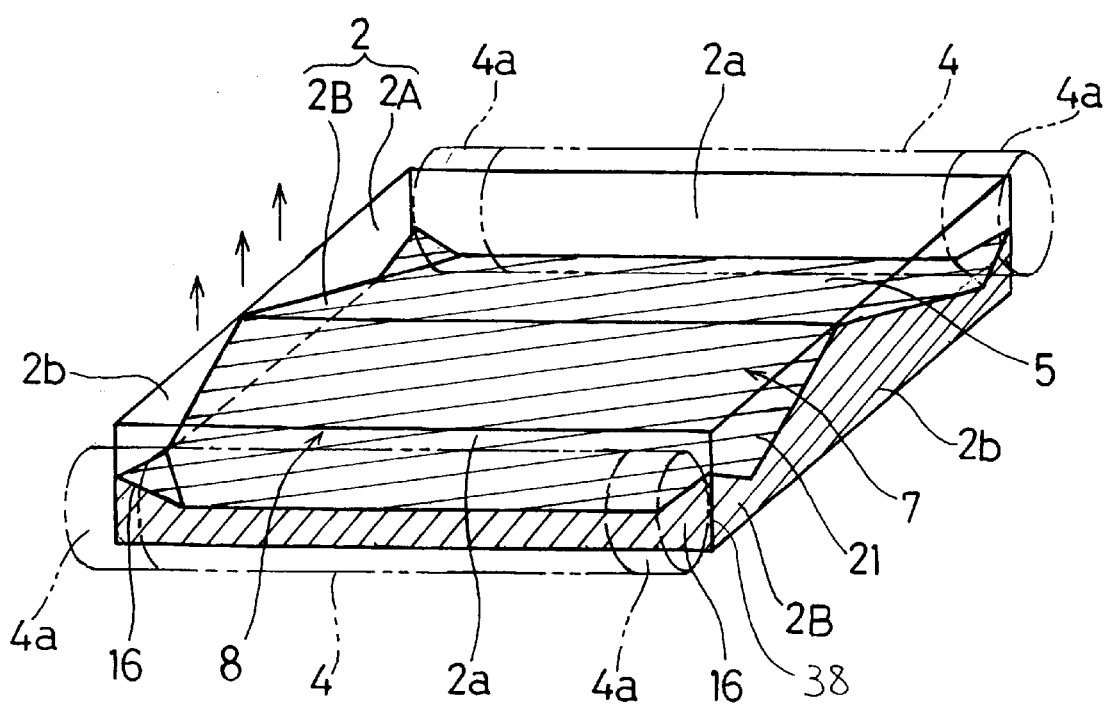
FIG. 3 is a schematic perspective view of the planar lighting device according to a third preferred embodiment of the present invention.

FIG. 3 illustrates the planar lighting device according to a third preferred embodiment of the present invention. This planar lighting device comprises a substantially flat light guide member 2 of a generally rectangular plate-like configuration having first and second end faces 2a opposite to each other and also having a light exit surface 5, and first and second light sources 4 disposed adjacent the respective end faces 2a of the flat light guide member 2 and extending parallel to each other in a direction longitudinally of the flat light guide member 2. This planar lighting device is so configured and so designed that rays of light emitted from the light sources 4 and subsequently entering the flat light guide member 2 through the opposite end faces 2a thereof can emerge outwardly from the light exit surface 5 after having been scattered within the light guide member 2.

The flat light guide member 2 includes a first light guide section 2A and a second light guide section 2B having a higher light scattering performance than that of the first light guide section 2A and overlapped with the first light guide section 2A in a thicknesswise direction thereof. The second light guide section 2B, for example, represents a shape similar to the shape of a flattened prism-like hill. The first light guide section 2A is formed as a non-scattering light guide region, having a plate thickness decreasing as the distance increases away from the end face 2a of the flat light guide member 2. In the illustrated embodiment, two first light guide sections 2A and 2A are symmetrically formed in adjoining relation with each other and, accordingly, have a generally V-shaped groove while the plate thickness thereof progressively decreasing as the distance increases from both end faces 2a attains the minimum value at the bottom of the V-shaped groove.

The second light guide section 2B includes a main body 15 having a plate thickness increasing as the distance increases away from the end face 2a of the flat light guide member 2, and brightness adjusting portions 16 each positioned adjacent opposite portions of a side region 7 of the flat light guide member 2 which confront respective electrode portions 4a at opposite ends of each of the light sources 4 and having a plate thickness increasing towards the end face 2a of the flat light guide member 2 and an associated one of opposite side faces 2b of the flat light guide member 2. The main body 15 is of an upwardly protruding shape similar to the shape of a hill while the plate thickness increasing as the distance increases from, for example, the opposite end faces 2a of the flat light guide member 2 attains the maximum value at the top of the hill. By overlapping the first and second light guide sections 2A and 2B one above the other, the flat light guide member 2 includes the second light guide section B of a shape similar to the shape of a flattened prism-like hill, and by causing rays of light to enter the end faces 2a, a high brightness can be obtained.

Figure 4A:
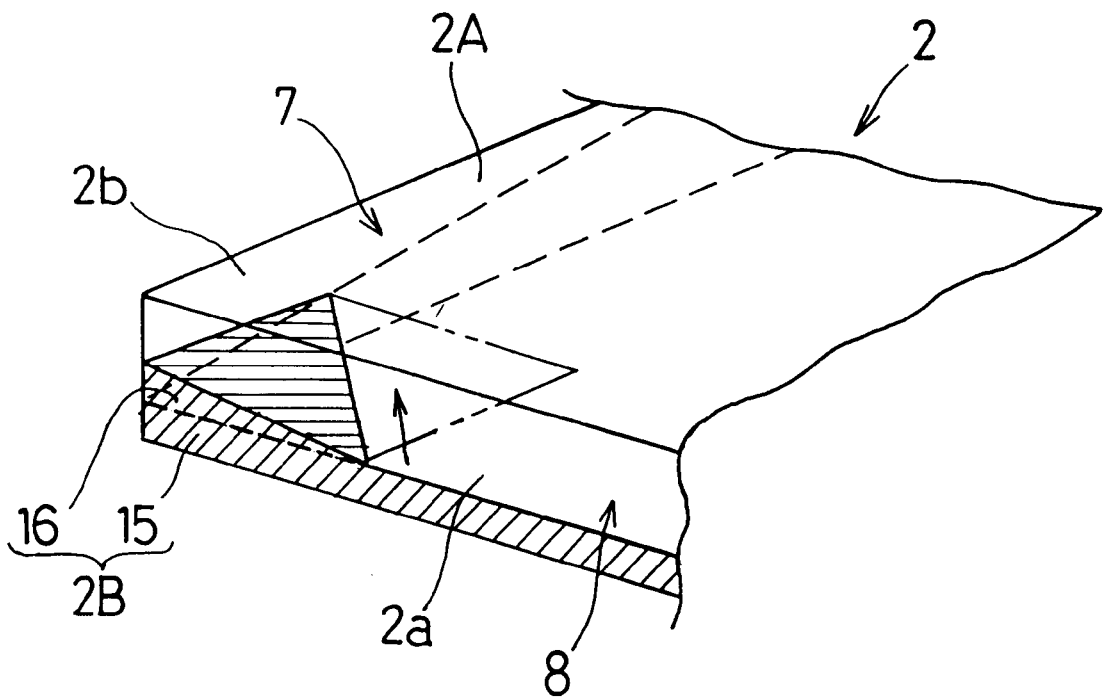
FIG. 4A is a schematic perspective view of the planar lighting device according to the third preferred embodiment of the present invention, showing a side portion of a light guide member used therein.
Figure 4B:
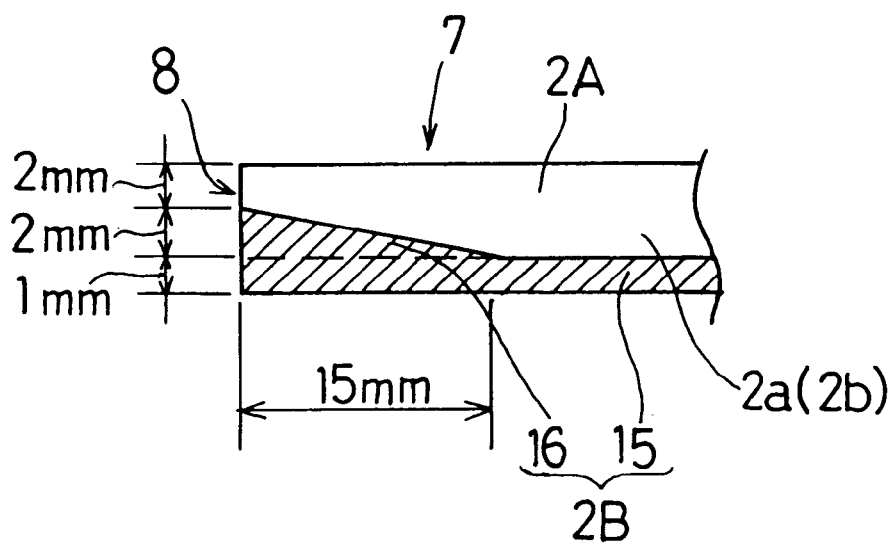
FIG. 4B is a schematic side view of the side portion of the light guide member shown in FIG. 4A.

One example of the side region 7 of the flat light guide member 2 facing each of the electrode portions 4a at the respective opposite ends of each of the light sources 4 is shown in FIG. 4. As shown in FIGS. 4A and 4B, each brightness adjusting portion 16 is provided as continued from the main body 15 of the second light guide section 2B and is formed into a triangular pyramid positioned between the first light guide section 2A and the main body 15 and having a triangular side surface defined on the corresponding end face 2a of the light guide member 2 and the corresponding side face 2b of the light guide member 2, with the triangular faces having a common side on a line 38 of intersection between the end face 2a and the side face 2b while a triangular bottom surface is defined on the main body 15.

By the action of the brightness adjusting portions 16 formed in the second light guide section 2B having a high light-scattering power, the brightness can be increased with no need to change the angle of exit of light at the side region 7 of the light guide member 2 since the amount of light can be increased by increasing the plate thickness of the second light guide section 2B at the side region 7 of the light guide member 2 so as to compensate for shortage of the amount of light relative to the side region 7 of the light guide member 2 resulting from the presence of the electrode portions 4a of each light source 4, to thereby increase the number of repetition of the scattering within the second light guide section 2B at the side region 7 of the light guide member 2. In this way, since no angle of exit of light is changed at the side region of the wedge-type light guide member, the direction of exit of light does not displace and, therefore, the uniformity of brightness is high, providing an increased brightness.

Also, although in the illustrated embodiment each of the brightness adjusting portions 16 is so shaped as to represent a triangular pyramid, this is because since as shown in FIG. 4A light from the corresponding light source 4 other than the electrode portions 4a enters diagonally into the side region 7 of the light guide member 2, the side region 7 of the light guide member 7 gains the amount of the diagonally incident light as the distance increases from the associated end face 2a of the light guide member 2 and, therefore, reduction in brightness can be minimized and it suffices to form the triangular bottom surface, not a square bottom surface (as shown by the double-dotted line), on the main body 15.

The flat light guide member 2 of the structure described above is made of a material of the same composition and is formed by sequentially injecting first and second resins, containing different concentrations of scattering particles to be mixed into the material, into and laminating within first and second shaping molds, followed by fusion-bonding the first light guide section 2A and the second light guide section 2B having a higher light scattering power than that of the first light guide section 2A so as to overlap one above the other in the thicknesswise direction thereof and finally by shaping the resultant product into a substantially flat plate-like configuration (Two-color injection molding method). By this two-color injection molding method, the brightness adjusting portions 16 can easily be formed with the use of the above described first and second shaping molds.

Figure 5:
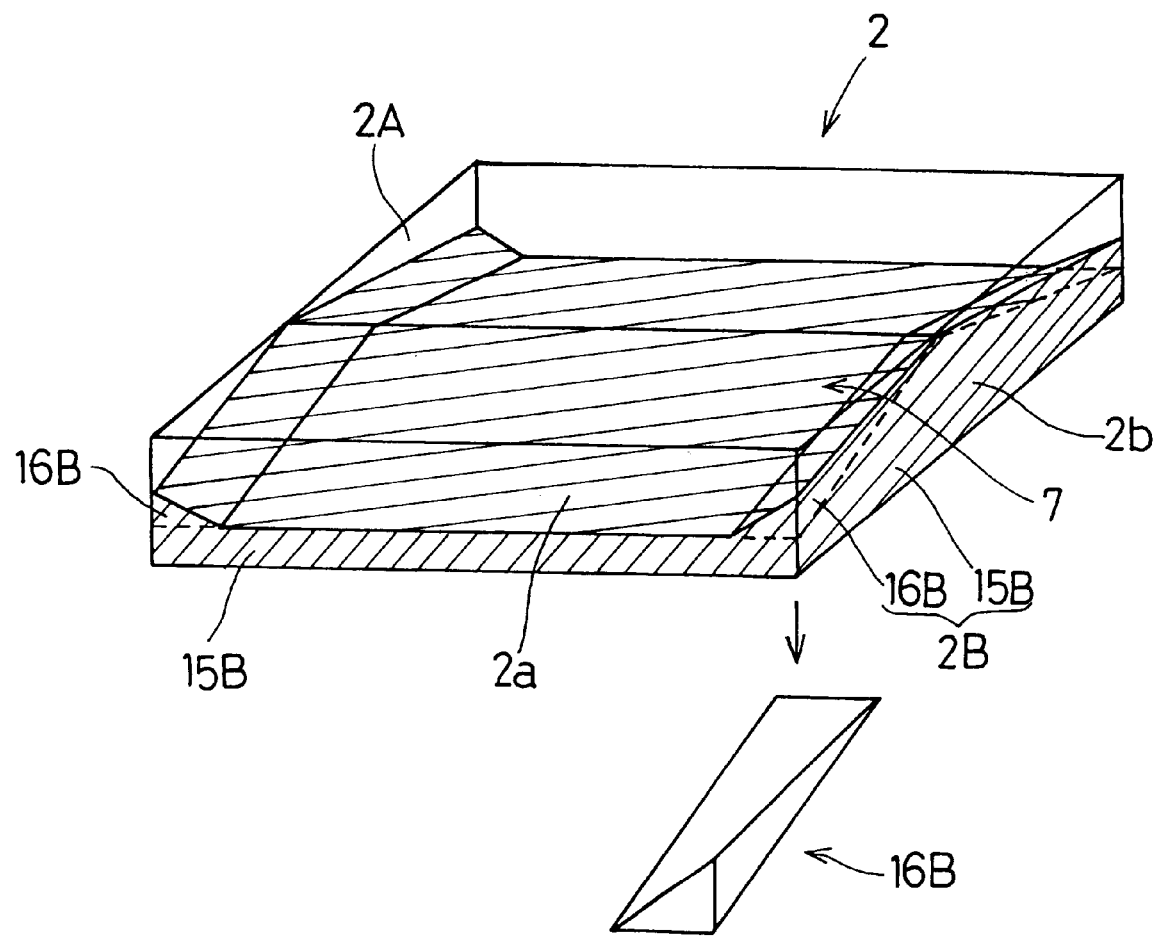
FIG. 5 is a schematic perspective view of the planar lighting device according to a fourth preferred embodiment of the present invention.

It is to be noted that although in the third embodiment of the present invention, each of the brightness adjusting portions 16 has been formed on the main body 15 in the form of a triangular pyramid, each of the brightness adjusting portions, as indicated by 16B in FIG. 5 showing a fifth preferred embodiment of the present invention, may be formed as a four-sided element having four faces. More specifically, each four-sided brightness adjusting portion 16B shown in FIG. 5 is similarly formed on the main body 15, having two triangular faces on the corresponding end face 2a and the corresponding side face 2b, respectively, and the remaining two faces being of a rectangular shape and also having a plate thickness increasing with increase of the distance from an intermediate portion thereof towards the end face 2a and the side face 2b.

Although in the third preferred embodiment of the present invention, the second light guide section 2B of the flat light guide member 2 represents a shape similar to the shape of a flattened prism-like hill, it may be of a hill-like shape similar to the shape of, for example, a polygonal pyramid such as, for example, a triangular pyramid or a square pyramid. In addition, without rendering it to represent a shape similar to the shape of a flattened prism-like hill, the second light guide section 2B may comprise two wedge-like light guide sections having different light scattering powers may be merely overlapped one above the other in the thicknesswise direction.

Figure 6:
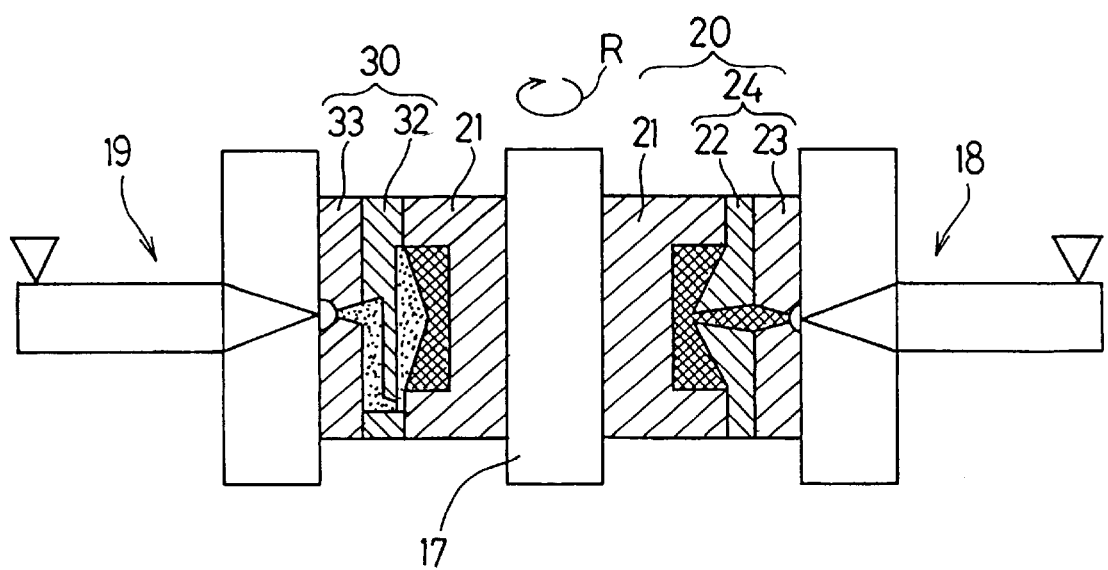
FIG. 6 is a schematic side sectional view, with a portion cut away, showing an apparatus used the practice of a method of molding the light guide member according to one preferred embodiment of the present invention.

FIG. 6 illustrates an injection molding apparatus used to form the flat light guide member according to one preferred embodiment of the present invention. The flat light guide member 10 formed in accordance with the present invention comprises, as shown in, for example, FIG. 18A, a first light guide section 11 having a recess of a shape similar to the inverted shape of a square pyramid and a second light guide section 12 having a protrusion of a shape similar to the inverted shape of a square pyramid. The molding apparatus shown in FIG. 6 includes a primary shaping mold assembly 20 and a secondary shaping mold assembly 30 positioned on respective sides of a die rotating mechanism 17 including a vertically extending rotary shaft, and first and second injecting devices 18 and 19 positioned externally of the primary and secondary shaping mold assemblies 20 and 30 with respect to the die rotating mechanism 17 for injecting first and second resins 1 and 3, respectively.

In the illustrated embodiment, the first and second, resins 1 and 3 contain fine particles in a different degree of mixing of the fine particles so that they can have a different light scattering power. However, the first resin 1 may be a transparent resin containing no fine particle mixed therein.

Figure 7:
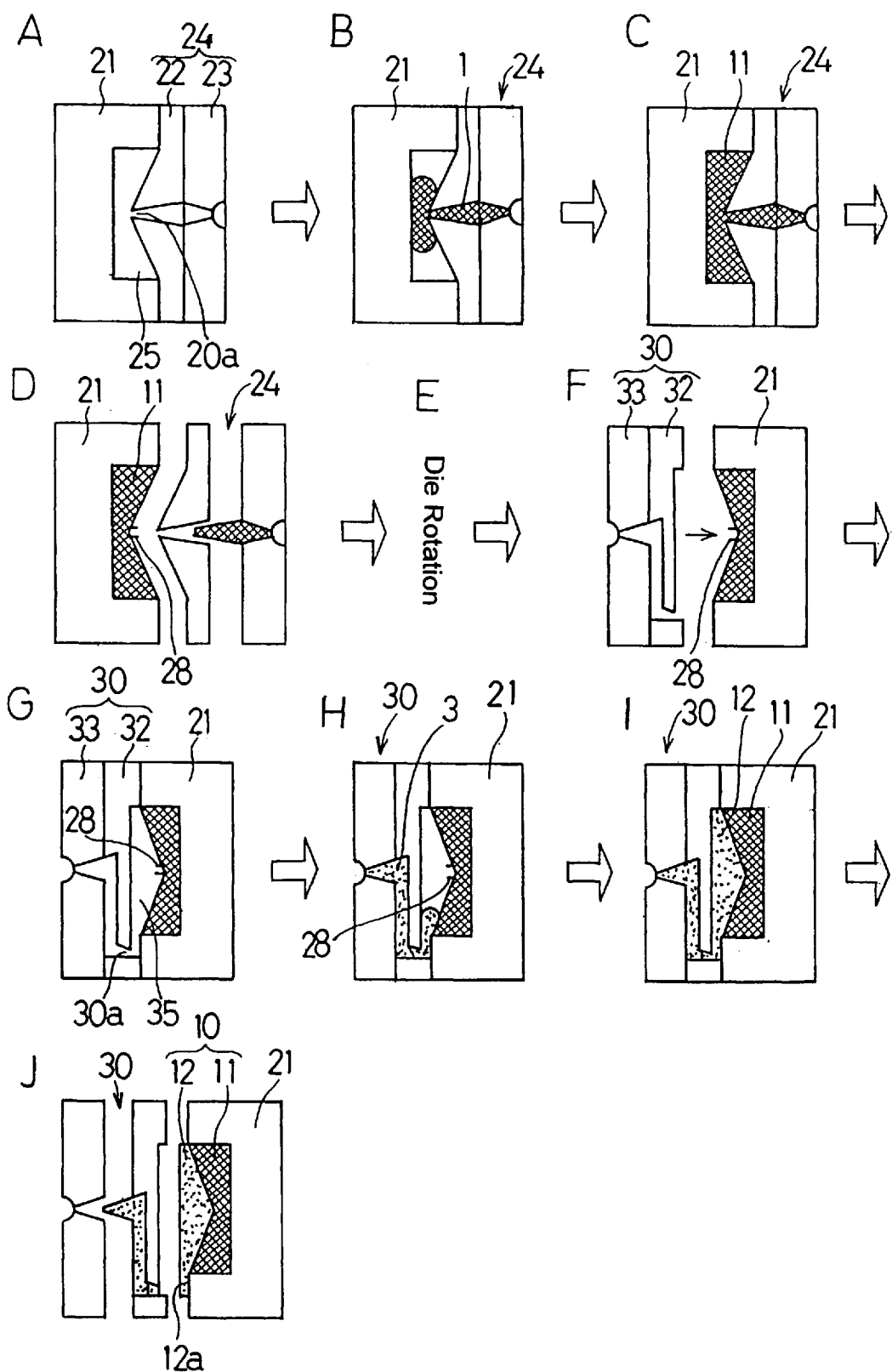
FIG. 7 is a schematic diagram showing the method of molding the light guide member according to one preferred embodiment of the present invention.

The primary shaping mold assembly 20 for forming a primary molded article 11 includes a, first mold 21 and a second mold 24 made up of mutually separable mold segments 22 and 23. A mold cavity 25 (See FIG. 7A) defined between the first and second molds 21 and 24 is of a shape complemental to the shape of the first light guide section 11. The primary shaping mold assembly 20 has an inlet port 20a defined at a location where a bottom apex 11a of the recess in the first light guide section 11 and its neighborhood can be eventually formed. In the illustrated instance, the inlet port 20a is oriented in a direction perpendicular to the bottom surface of the first light guide section 11 that is eventually formed.

The secondary shaping mold assembly 30 for forming the second light guide section 12 is made up of mutually separable mold segments 32 and 33. A cavity 35 (See FIG. 7G) defined between the first light guide section 11 being then formed and the secondary shaping mold assembly 30 is of a shape complemental to the shape of the second light guide section 12. The secondary shaping mold assembly 30 has an inlet port 30a defined at a location where an outer peripheral portion of the second light guide section 12 can be eventually formed. In the illustrated instance, the inlet port 30a is oriented in such a direction that the resin can be injected externally to the outer peripheral portion of the second light guide section 12. The mold segment 23 of the primary shaping mold assembly 20 and the mold segment 33 of the secondary shaping mold assembly 30 are of an identical shape and construction and can therefore be used interchangeably. The die rotating mechanism 17 is used to rotate the first mold 21 of the primary shaping mold assembly 20 in a direction shown by the arrow R about the vertical rotary shaft thereof.

FIGS. 7A to 7J schematically illustrate the sequence of injection molding to form the flat light guide member according to one preferred embodiment of the present invention. Hereinafter, the injection molding process will be described in detail in connection with formation of the flat light guide member 10.

While the first shaping mold assembly 20 is set ready for molding as shown in FIG. 7A, the first resin 1 as a material for the first light guide section 11 is injected from the inlet port 20a of the primary shaping mold assembly 20 into the cavity 25 as shown in FIG. 7B. The first resin 1 being injected into the cavity 25 preferably has a temperature within the range of 240 to 270° C. and an MI within the range of 2 to 10 g/10 min and is preferably injected under an injection pressure of 600 to 1,200 kg/cm$^2$. When as shown in FIG. 7C the first light guide section 11 is formed after the first resin 1 has filled up in the cavity 25 and has subsequently been cured substantially, the second mold 24 is opened as shown in FIG. 7D. At this time, a burr (traces of the inlet port) 28 remains sticking to the surface of the recess 11a of the first light guide section 11.

Figure 18A:
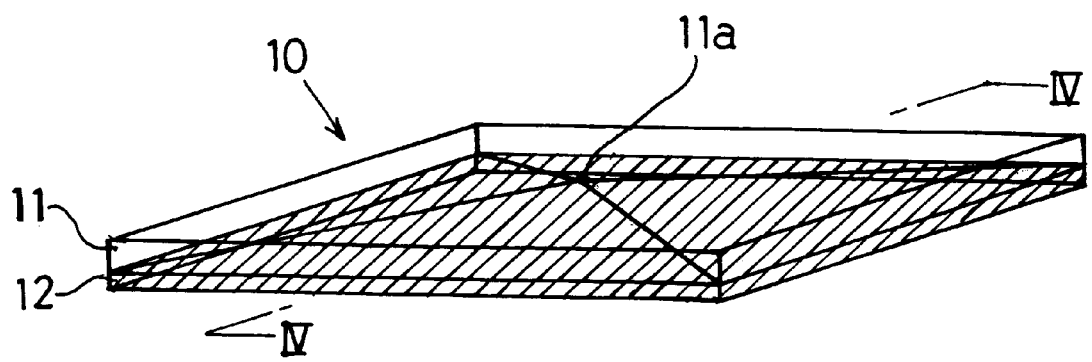
FIG. 18A is a schematic perspective view of one example of the light guide member.
Figure 18B:
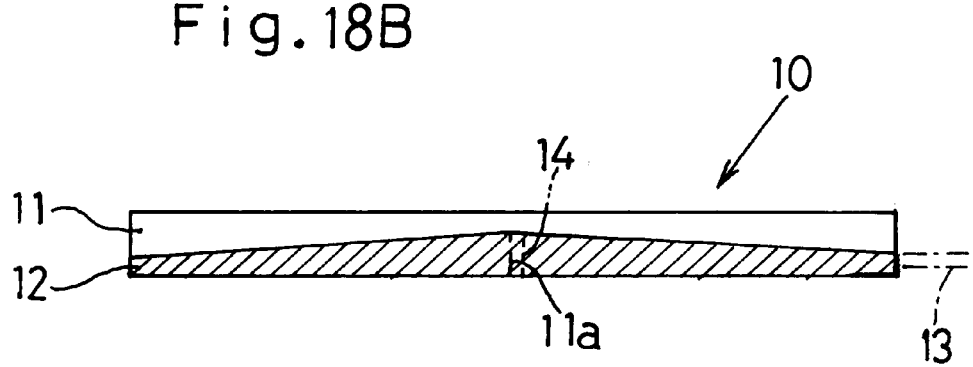
FIG. 18B is a schematic cross-sectional view taken along the line 4 IV—IV in FIG. 18A.

Thereafter, while the first light guide section 11 remains within the first mold 21, the first mold 21 is rotated by the die rotating mechanism 17 in a horizontal plane in the direction R as shown in FIG. 7E to allow the first mold 21 to assume a position confronting the secondary shaping mold assembly 30 as shown in FIG. 7F. Subsequently, the secondary shaping mold assembly 30 is advanced towards the first mold 21 and is then mated together with the first mold 21. The second resin 3 as a material for the second light guide section 12 is then injected into the cavity 35 through the inlet port 30a of the secondary shaping mold assembly 30 as shown in FIG. 7H. The second resin 3 being injected into the cavity 35 preferably has a temperature within the range of 240 to 270° C. and an MI within the range of 12 to 30 g/10 min and is preferably injected under an injection pressure of 600 to 1,200 kg/cm$^2$. When as shown in FIG. 7I the second light guide section 12 is formed after the second resin 3 has filled up in the cavity 35 and has subsequently been cured substantially, the secondary shaping mold assembly 30 is opened as shown in FIG. 7J. The second resin 3 for the second light guide section 12, when filling up the cavity 35 while flowing along the first light guide section 11, melts the burr 28 left in the first light guide section 11 to disappear. In this way, the second light guide section 12 is laminated over the first light guide section 11. Finally, an outwardly protruding resin runner 12a formed by the inlet port 30a is removed by cutting to thereby complete the flat light guide member 10 (FIG. 18A).

In such case, since the first light guide section 11 is formed within the first mold, followed by formation of the second light guide section 12 within the second mold, there is a time lag between formations of the first and second light guide sections 11 and 12 and, therefore, it may occur that the injection-molded light guide member 2 will have, for example, the first light guide section having been warped upwardly as shown in FIG. 8A.

For this reason, as shown in FIG. 8A, after the injection molding, the injection-molded flat light guide member 2 is placed on a suitable adiabatic support plate 40 with the first light guide section 11 positioned above the second light guide section 12 and with the second light guide section 12 held in contact with the adiabatic support plate 40, followed by heating of the light guide member 2 from above as shown in FIG. 8B with the use of an infrared heater 41. After the light guide member 2 has been allowed to stand for a predetermined length of time, the light guide member 2 can assume a flat shape and the infrared heater 41 is subsequently removed from the light guide member 2. The light guide member 2 is thereafter cooled slowly as shown in FIG. 8C. In this way, the warping of the light guide member 2 can be eliminated.

It is to be noted that although in the previously described embodiment the flat light guide member 2 has been prepared by the use of the injection molding method, a casting polymerization method can be employed in place of the injection molding method.

Hereinafter, the present invention will be demonstrated by way of examples which are not intended to limit the scope of the present invention, but only for illustrative purpose.

EXAMPLE I

The first light guide section which is a non-scattering light guide region and the second light guide section which is a scattering light guide region were cast-polymerized to provide the light guide member 2 of the structure shown in FIG. 1. The first light guide section 2A was prepared by cast-polymerizing methyl methacrylate containing no particle and added with 0.50 wt % of benzoyl peroxide (BPO) as a radical polymerization initiator and 0.40 wt % of n-lauryl mercaptan as a chain transfer agent, at 70° C. for 24 hours. The first light guide section 2A was 389×286 mm in size and was of a configuration inwardly curved to a plate thickness progressively decreasing from 9 mm (the minimum thickness portion) to 1 mm (the maximum thickness portion) which was attained at a center area of the first light guide section 2A. The second light guide section 2B was prepared by adding 0.50 wt % of benzoyl peroxide (BPO) as a radical polymerization initiator and 0.40 wt % of n-lauryl mercaptan as a chain transfer agent to a sample prepared by uniformly adding and dispersing 0.20 wt % of TOSPAL Grade 145 (available from Toshiba Silicone Kabushiki Kaisha. Silicone particle size: 4.5 μm) in methacrylate (MMA) containing no particle. This syrup was poured into a recessed portion of the first light guide section 2A and was cast-polymerized at 70° C. for 4 hours to complete the flat light guide member.

Figure 9:
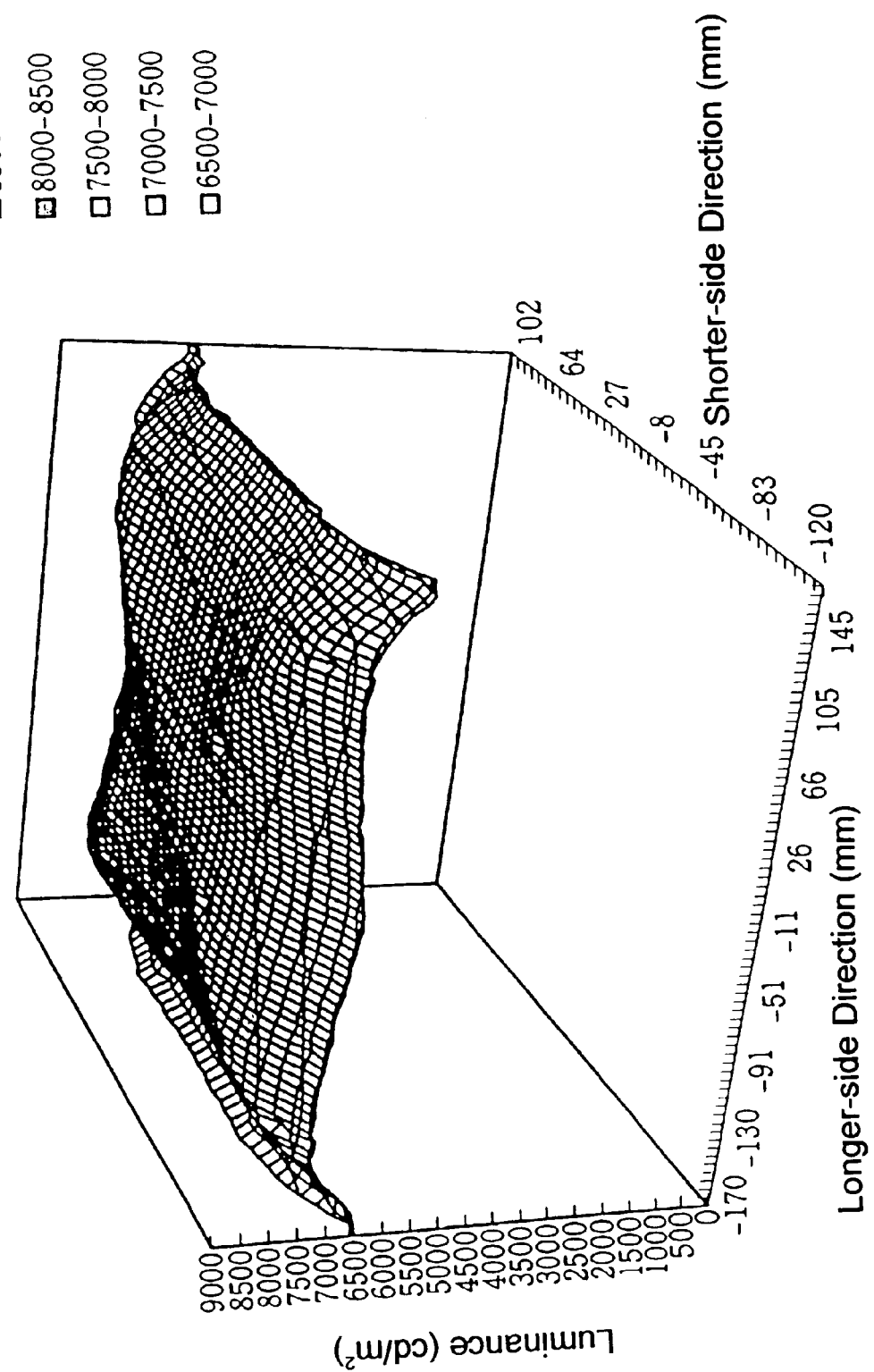
FIG. 9 is a characteristic graph showing the relation between the distance away from an end face of the light guide member and the brightness at a light exit surface of the light guide member.

In the planar lighting device shown in FIG. 1, using the tubular light sources 4 each having a center luminance of 28,600 cd/m$^2$, the brightness at the light exit surface 5 of the flat light guide member 2 was measured with a luminance meter (Model CA-1000, available from Minolta Kabushiki Kaisha). When the pattern of distribution of brightness of the vertically emerging light was evaluated with the use of an image analyzing apparatus, the planar lighting device could be obtained which has exhibited a high luminance of about 7,800 cd/m$^2$ over the entire light exit surface thereof and also exhibiting a high uniformity in luminance represented by 85% in contrast ratio as shown in FIG. 9.

EXAMPLE II

The first light guide section 1 which is a non-scattering light guide region was formed by the use of an injection molding technique and was subsequently cast-polymerized together with the second light guide section to thereby provide the flat light guide member 10 shown in FIG. 18A. The second light guide section 12 was prepared by supplying 100 parts by weight of pellets of polymethyl methacrylate and 0.60 part by weight of TOSPAL Grade 145 (available from Toshiba Silicone Kabushiki Kaisha. Silicone particle size: 4.5 μm) to a double-screw extruder (Screw specification: L/D=32, 44 mm in diameter) by means of a gravity feeder, kneading this mixture within a cylinder heated to 240° C., pelletizing the kneaded mixture into pellets which were subsequently supplied to an injection molding machine, and finally molding the pellets under the molding condition in which the cylinder temperature was 240° C., the mold temperature was 80° C. and the mold clamping pressure was 450 tons. The resultant second light guide section 12 was 389×286 mm in size and was of a configuration having a square pyramidal protrusion having a plate thickness progressively increasing from 0.5 mm (the minimum thickness portion) at a peripheral area thereof to 3.5 mm (the maximum thickness portion) which was attained at a center area of the second light guide section 12. Thereafter, the second light guide section 11 was inserted in a mold of 389 mm in height, 286 in width and 9 mm in thickness, followed by pouring of a melt of pellets of polymethyl methacrylate containing no particle to eventually form the first light guide section 11 having a recess of a shape similar to the inverted shape of a square pyramid, thereby completing the preparation of the flat light guide member.

Figure 10:
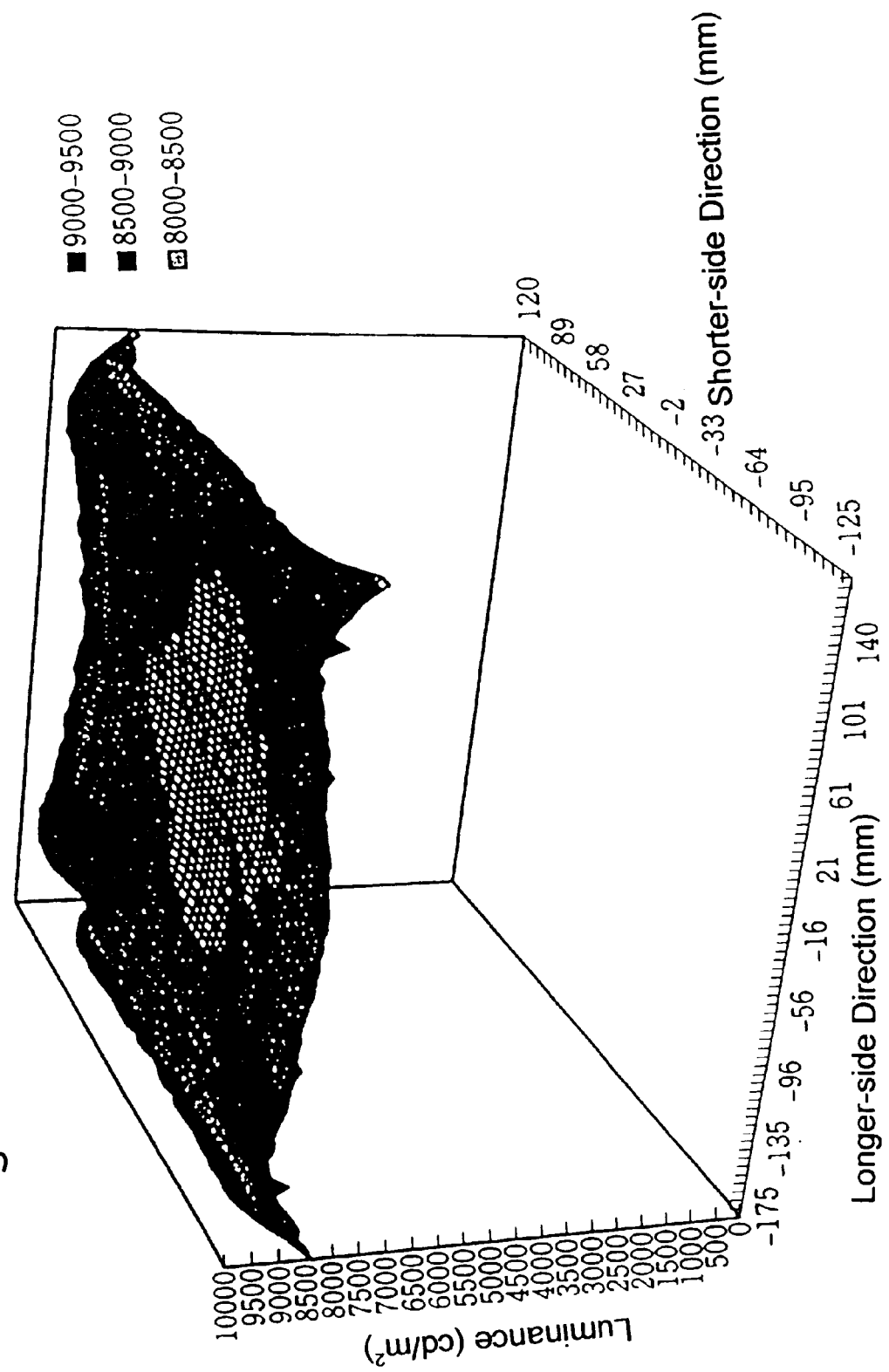
FIG. 10 is a characteristic graph showing the relation between the distance over which light is guided in the light guide member and the brightness at a light exit surface of the light guide member.

Using the flat light guide member 10 shown in FIG. 18A in the planar lighting device including the light source positioned in the vicinity of each of the opposite end faces thereof, measurement of the luminance was carried out in a manner similar to that in Example I. As a result, the planar lighting device could be obtained which has exhibited a high luminance of about 8,500 cd/m$^2$ over the entire light exit surface thereof and also exhibiting a high uniformity in luminance represented by 90% in contrast ratio as shown in FIG. 10.

EXAMPLE III

Figure 15:
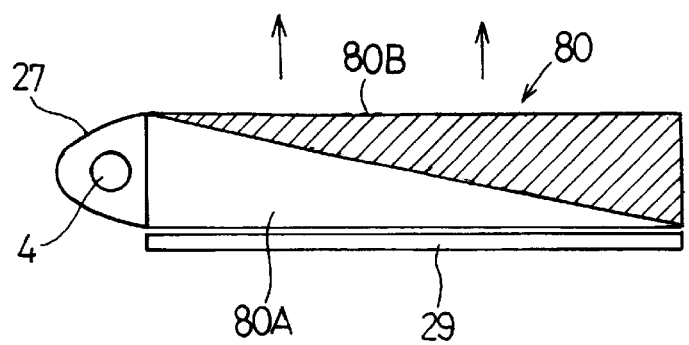
FIG. 15 is a schematic perspective view showing the planar lighting device including two wedge-shaped light guide sections.
Figure 16:
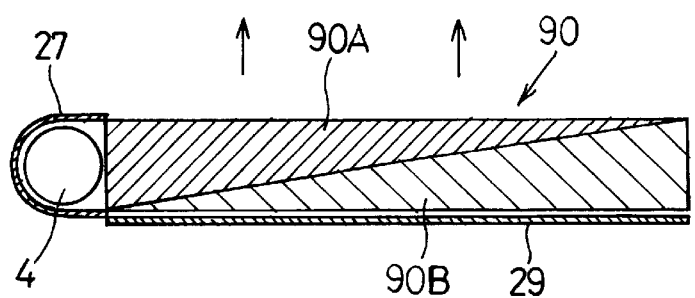
FIG. 16 is a schematic perspective view showing the planar lighting device including two wedge-shaped light guide sections.

The wedge-shaped first light guide section which is a non-scattering light guide region and the second light guide section which is a scattering light guide region were successively injected into and laminated within the shaping mold assembly to thereby provide a flat light guide member 80 shown in FIG. 15. The second light guide section 80B was prepared by supplying 100 parts by weight of pellets of polymethyl methacrylate and 0.60 part by weight of TOSPAL Grade 145 (available from Toshiba Silicone Kabushiki Kaisha. Silicone particle size: 4.5 μm) to a double-screw extruder (Screw specification: L/D=32, 44 mm in diameter) by means of a gravity feeder, kneading this mixture within a cylinder heated to 240° C., pelletizing the kneaded mixture into pellets which were subsequently supplied to an injection molding machine, and finally molding the pellets under the molding condition in which the cylinder temperature was 240° C., the mold temperature was 80° C. and the mold clamping pressure was 450 tons. The resultant second light guide section 80B was 400×300 mm in size and was of a wedge-shaped configuration having a plate thickness linearly varying from 1 mm (the minimum thickness portion) at and along a shorter-side thereof to 5 mm (the maximum thickness portion). Thereafter, by similarly injecting pellets of only polymethyl methacrylate containing no particle, the wedge-shaped first light guide section 80A, 400×300 mm in size, was obtained which is of a wedge-shaped configuration having a plate thickness linearly varying from 1 mm (the minimum thickness portion) at and along a shorter-side thereof to 5 mm (the maximum thickness portion). The first and second light guide sections 80A and 80B were subsequently laminated one above the other in a complementary relation to thereby provide the flat plate-like light guide member.

In the planar lighting device shown in FIG. 15, measurement was carried out in a manner similar to that in Example I and, as a result, the planar lighting device capable of emitting light in two directions opposite to each other from the light exit surface and the reflecting surface, respectively, could be obtained which has exhibited a high luminance of about 500 cd/m$^2$ over the entire light exit surface thereof and also exhibiting a high uniformity in luminance represented by 90% in contrast ratio.

EXAMPLE IV

The first and second resins having different light scattering powers, respectively, were successively injected into and laminated together within the shaping mold assembly to thereby provide the flat light guide member 2 shown in FIG. 3. For the first resin, Acripet Grade VH (available from Mitsubishi Rayon Kabushiki Kaisha) was used. For the second resin, a palletized material was used which was prepared from Delpet Grade 70FR (available from Asahi Kasei Kogyo Kabushiki Kaisha) mixed with 0.3 wt % of TOSPAL Grade 145 (available from Toshiba Silicone Kabushiki Kaisha. Silicone particle size: 4.5 μm). This flat light guide member 2 has the brightness adjusting portions 16 of a triangular pyramid shape formed on the second light guide section 2B of the hill-like shape similar to the shape of a prism. Parallel light sources 4 were disposed along the opposite end faces of the light guide member 2, respectively, so as to extend longitudinally thereof. Where, for example, the flat light guide member 2 is 15 inches in size and each of the electrode portions 4a of each of the light sources 4 is 8 mm, each of the brightness adjusting portions 16 was formed on the main body 15 to a triangular pyramidal shape wherein two triangles defined on the end face 2a and the side face 2b, respectively, has a height of 2 mm (the height of an apex defined by the intersection between the end face 2a and the side face 2b) and a length of 15 mm as shown in FIGS. 4A and 4B.

Figure 11:
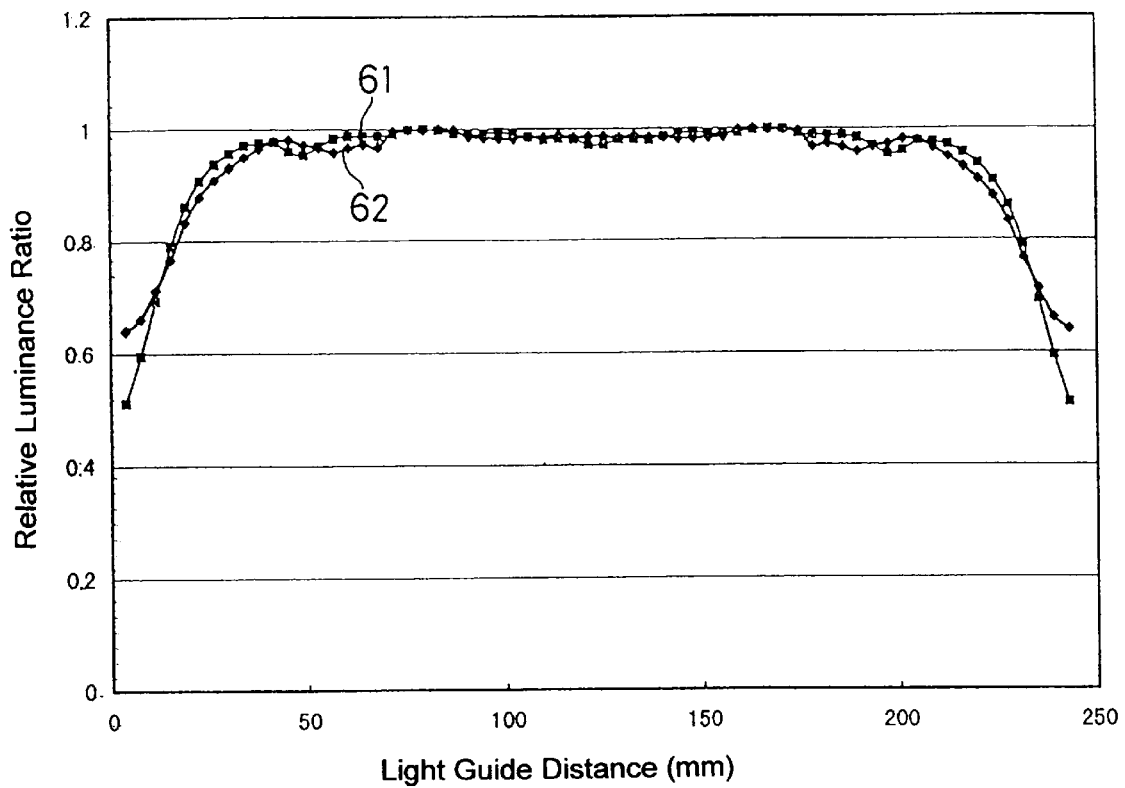
FIG. 11 is a characteristic graph showing plotted relative luminance ratios relative to the distance over which the light is guided in the light guide member.
Figure 17:
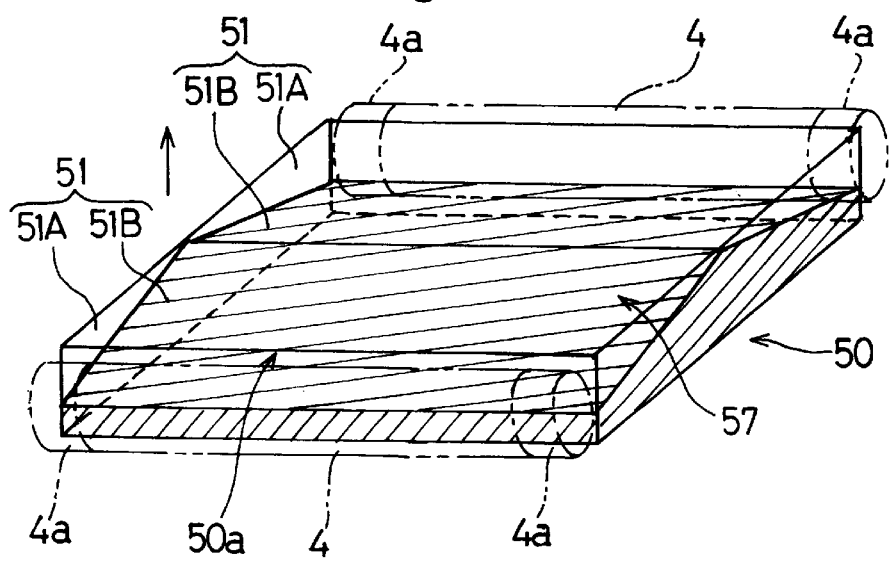
FIG. 17 is a schematic perspective view showing the planar lighting device including a hill-shaped light guide section.

Using the above described flat light guide member 2, the relative luminance ratio was measured for a light guiding distance over which the light is guided. The result of this measurement is shown in FIG. 11, wherein the axis of abscissas represents the light guiding distance, that is, the distance from the end face 2a in terms of millimeter whereas the axis of ordinates represents the relative luminance ratio. A line 61 is associated with the light guide member having the brightness adjusting portions in accordance with the present invention and it will readily be seen that the relative luminance ratio is 64.0% as measured at the side of the light guide member. A line 62 is associated with the flat guide member having no brightness adjusting portion such as shown in FIG. 17 and it will readily be seen that the relative luminance ratio is 51.1% as measured at the side of the flat light guide member. Thus, the provision of the brightness adjusting portions in the flat guide member in accordance with the present invention is effective to avoid lowering of the brightness at the side of the light guide member which would otherwise result from the electrode portions and, therefore, a frame portion of the display screen can have a reduced size by about 20 mm.

The method of making the flat light guide member according to the present invention is particularly suited where the flat light guide member has a relatively small thickness and a relatively large size, for example, has a degree of flatness of the light guide member (the aspect ratio defined by [Thickness/Length]) which is 10 or greater and a size of 120×90 mm or larger. The flat light guide member in each of the following Examples V and VI and Comparison was manufactured by the method shown in and described with reference to FIG. 7, in which the first and second resins used have a different composition.

EXAMPLE V

Acripet Grade VH (available from Mitsubishi Rayon Kabushiki Kaisha. MI=2.0 g/10 min as measured according to ASTM-D1238) was used for the first resin and a palletized material (MI=12 g/10 min) prepared from Delpet Grade 70FR (available from Asahi Kasei Kogyo Kabushiki Kaisha. MI=12 g/10 min) mixed with 0.3 wt % of TOSPAL Grade 145 (available from Toshiba Silicone Kabushiki Kaisha.) was used for the second resin. The difference between MI of the first resin and that of the second resin is 10 g/10 min, and non-uniformity did not almost occur in the flat light guide member.

EXAMPLE VI

The same composition as in Example V is used for the first resin whereas for the second resin, a palletized material (MI=22 g/10 min) prepared from Parapet Grade H-S (available from Kabushiki Kaisha Kuraray. MI=22 g/10 min) mixed with 0.3 wt % of TOSPAL Grade 145 (available from Toshiba Silicone Kabushiki Kaisha.) is used. The difference between the MI of the first resin and that of the second resin is 20 g/10 min and non-uniformity did not occur in the flat light guide member.

Comparison

For the first resin, the same composition as in Example V is used while for the second resin, a palletized material (MI=10 g/10 min) prepared from Acripet Grade TF8 (available from Mitsubishi Rayon Kabushiki Kaisha. MI=10 g/10 min) mixed with 0.3 wt % of TOSPAL Grade 145 (available from Toshiba Silicone Kabushiki Kaisha) is used. The difference between the MI of the first resin and that of the second resin is 8 g/10 min and non-uniformity was found in the light guide member.

Figure 12:
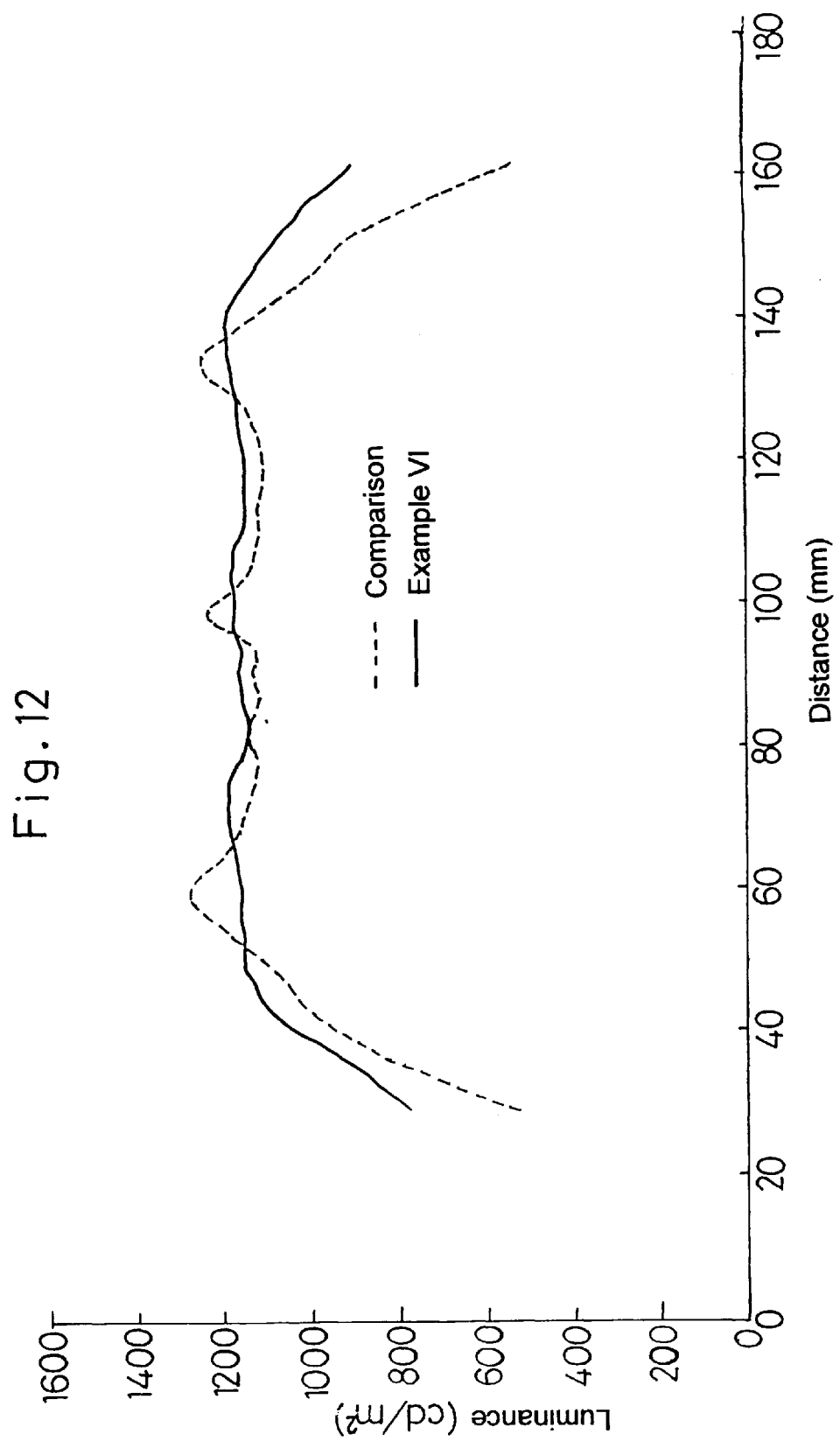
FIG. 12 is a characteristic graph showing a pattern of distribution of brightness adjacent a secondary inlet port.
Figure 13:
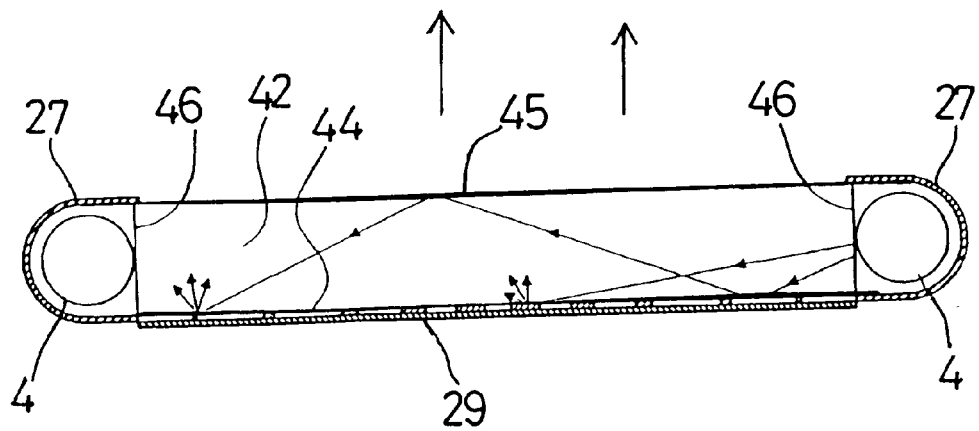
FIG. 13 is a schematic perspective view showing the planar lighting device including a flat plate-shaped light guide section.
Figure 14:
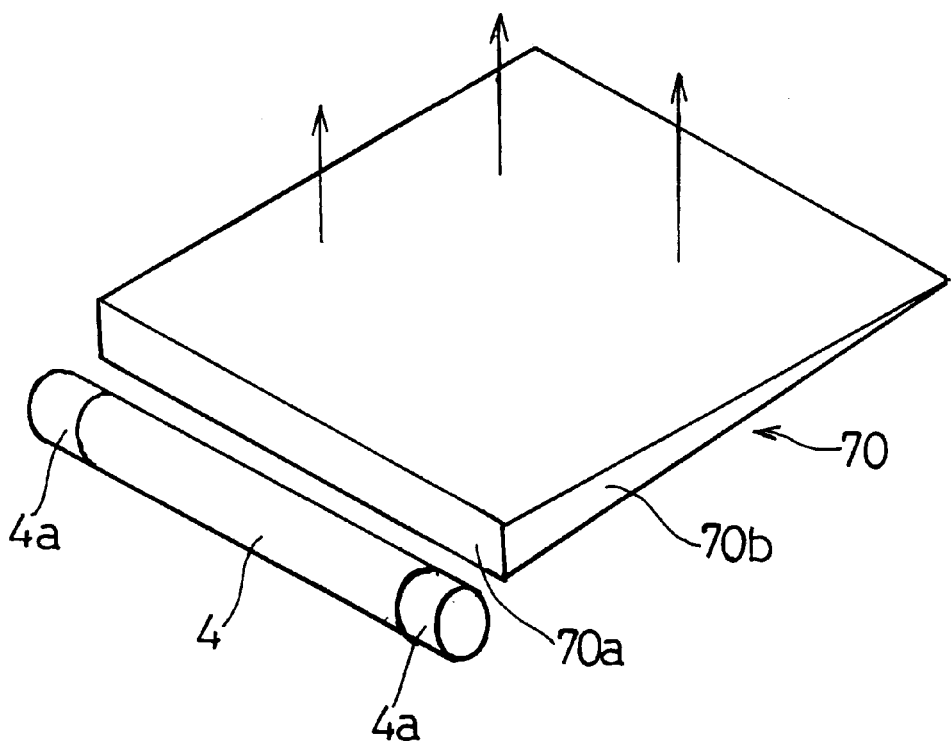
FIG. 14 is a schematic perspective view showing the flat light guide device including a single wedge-shaped light guide section.

The pattern of distribution of brightness at a location adjacent the inlet port of the secondary shaping mold assembly is shown in FIG. 12, in which the axis of abscissas represents the distance (mm) from the inlet port and the axis of ordinates represents the luminance (cd/m$^2$). The pattern of distribution of brightness exhibited by the flat light guide member obtained in Example VI and that exhibited by the flat light guide member obtained in Comparison are shown by the solid line and the broken line, respectively. While the flat light guide member in Comparison has exhibited non-uniformity, the flat light guide member in Example VI has exhibited no non-uniformity, but exhibited a high uniformity in brightness.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A planar lighting device which comprises:
   a substantially flat plate-like light guide member having end faces opposite to each other and also having a light exit surface;
   at least one tubular light source disposed adjacent the end face of the light guide member in face-to-face relation thereto, rays of light incident upon the light guide member from the light source being scattered and subsequently emerging outwardly from the light exit surface of the light guide member;
   said light guide member including first and second light guide sections made of a material of the same composition, said first light guide section being a non-scattering light guide region whereas said second light guide section is made of said material mixed with scattering particles having a different index of refraction, said first and second light guide sections being overlapped one above the other in a thicknesswise direction thereof and fusion bonded without any adhesive agent; and
   wherein by partially varying the degree of occupancy of each of the first and second light guide sections in the direction across the thickness of the light guide member according to the position from the end faces, the brightness of light emerging from the light exit surface of the light guide member is controlled.

2. The planar lighting device as claimed in claim 1, wherein said light guide member further includes a third light guide section made of a material of the same composition as that of the material of the first and second light guide sections, said third light guide section having a higher concentration of scattering particles than that in the second light guide section and wherein the first, second and third light guide sections being overlapped one above the other in the thicknesswise direction and fusion bonded without any adhesive agent.

3. The light guide member employed in the planar lighting device as claimed in claim 1.

4. A method of molding the flat light guide member as defined in claim 3, by successively injecting and laminating a first resin to form the first light guide section and a second resin to form the second guide section, which method comprises the steps of:
   injecting the first resin into a primary shaping mold assembly including first and second molds to form a first light guide section;
   opening the primary shaping mold assembly with the second mold separated relatively from the first mold with said first light guide section retained by said first mold;
   coupling a secondary shaping mold assembly to the first mold while the first light guide section is retained by said first mold; and
   injecting the second resin into the secondary shaping mold assembly to form a second light guide section that is then laminated with the first light guide section.

5. The light guide member molding method as claimed in claim 4, wherein the light guide member comprises the first light guide section having a recess of a shape similar to the inverted shape of a hill and the second light guide section having a protrusion of a shape similar to the shape of a hill, and wherein said first light guide section is molded by the first resin which is injected through an inlet port of the primary shaping mold assembly which is defined at a location corresponding to a portion where a bottom apex of the recess is formed in the first light guide section.

6. The light guide member molding method as claimed in claim 5, wherein the second light guide section is molded by the second resin which is injected through an inlet port of the secondary shaping mold assembly which is defined at a location corresponding to a portion where an outer peripheral portion of the second light guide section is formed.

7. The light guide member molding method as claimed in claim 4, wherein the second resin for the second light guide section has a melt index which is greater than that of the first resin for the first light guide section by 10 g/10 min or more.

8. A planar lighting device which comprises:
   a substantially flat plate-like light guide member having end faces opposite to each other and also having a light exit surface;
   at least one tubular light source disposed adjacent the end face of the light guide member in face-to-face relation thereto, rays of light incident upon the light guide member from the light source being scattered and subsequently emerging outwardly from the light exit surface of the light guide member;
   said light guide member including first and second light guide sections made of a material of the same composition having a different concentration of scattering particles mixed therein, said second light guide section having a higher light scattering power than that of the first light guide section, said first and second light guide sections being overlapped one above the other in a thicknesswise direction thereof and fusion bonded without any adhesive agent; and
   said first light guide section having a plate thickness decreasing as the distance increases away from the end face of the light guide member,
   said second light guide section including a main body having a plate thickness increasing as the distance increases away from the end face of the light guide member, and at least one brightness adjusting portion having a plate thickness increasing towards the end faces of the light guide member and side faces of the light guide member, said brightness adjusting portion being disposed at a location adjacent the side face of the light guide member and in face-to-face relation with an electrode portion at one end of the light source.

9. The planar lighting device as claimed in claim 8, wherein said brightness adjusting portion is formed in continuation with the main body of the second light guide section and positioned between the first light guide section and the main body of the second light guide section, said brightness adjusting portion being of a triangular pyramid shape having a triangular side face defined on each of the end and side faces of the light guide member, said triangular faces having a common side on a line of intersection of the end and side faces of the light guide member and a bottom face defined on the main body.

10. The light guide member employed in the planar lighting device as claimed in claim 8.

11. A method of molding the flat light guide member as defined in claim 10, by successively injecting and laminating a first resin to form the first light guide section and a second resin to form the second guide section, which method comprises the steps of:
   injecting the first resin into a primary shaping mold assembly including first and second molds to form a first light guide section;
   opening the primary shaping mold assembly with the second mold separated relatively from the first mold with said first light guide section retained by said first mold;

coupling a secondary shaping mold assembly to the first mold while the first light guide section is retained by said first mold; and injecting the second resin into the secondary shaping mold assembly to form a second light guide section that is then laminated with the first light guide section.

12. The light guide member molding method as claimed in claim 11, wherein the light guide member comprises the first light guide section having a recess of a shape similar to the inverted shape of a hill and the second light guide section having a protrusion of a shape similar to the shape of a hill, and wherein said first light guide section is molded by the first resin which is injected through an inlet port of the primary shaping mold assembly which is defined at a location corresponding to a portion where a bottom apex of the recess is formed in the first light guide section.

13. The light guide member molding method as claimed in claim 12, wherein the second light guide section is molded by the second resin which is injected through an inlet port of the secondary shaping mold assembly which is defined at a location corresponding to a portion where an outer peripheral portion of the second light guide section is formed.

14. The light guide member molding method as claimed in claim 11, wherein the second resin for the second light guide section has a melt index which is greater than that of the first resin for the first light guide section by 10 g/10 min or more.

* * * * *